US012597838B2

(12) United States Patent
Liu

(10) Patent No.: US 12,597,838 B2
(45) Date of Patent: Apr. 7, 2026

(54) GENERATOR WITH MINIMAL TO NON-EXISTENT ROTATION RESISTANCE THROUGH CONTROLLED ATTRACTIONS AMONG ALL MAGNETS AND IRON CORES

(71) Applicant: Chien-Kuo Liu, Honolulu, HI (US)

(72) Inventor: Chien-Kuo Liu, Honolulu, HI (US)

(73) Assignee: Chien-Kuo Liu, Honolulu, HI (US)

( * ) Notice: Subject to any disclaimer, the term of this patent is extended or adjusted under 35 U.S.C. 154(b) by 122 days.

(21) Appl. No.: 18/468,559

(22) Filed: Sep. 15, 2023

(65) Prior Publication Data

US 2024/0186873 A1     Jun. 6, 2024

Related U.S. Application Data

(60) Provisional application No. 63/419,249, filed on Oct. 25, 2022.

(51) Int. Cl.
H02K 19/16          (2006.01)
H02K 5/04          (2006.01)

(52) U.S. Cl.
CPC .............. H02K 19/16 (2013.01); H02K 5/04 (2013.01)

(58) Field of Classification Search
CPC ........... H02K 19/16; H02K 53/00; H02K 5/04

USPC .......................................................... 310/152
See application file for complete search history.

(56) References Cited

U.S. PATENT DOCUMENTS

| | | | |
|---|---|---|---|
| 2006/0033392 A1* | 2/2006 | Ritchey | ................. H02K 21/12 310/112 |
| 2006/0290219 A1 | 12/2006 | Rodger et al. | |
| 2014/0084734 A1 | 3/2014 | Ishigami et al. | |
| 2016/0254708 A1 | 9/2016 | So | |

FOREIGN PATENT DOCUMENTS

KR          102060252 B1 * 12/2019   ............... H05H 7/04

OTHER PUBLICATIONS

English Translation of KR-102060252-B1 (Year: 2019).*

* cited by examiner

*Primary Examiner* — Terrance L Kenerly
*Assistant Examiner* — Theodore L Perkins
(74) *Attorney, Agent, or Firm* — Seed IP Law Group LLP

(57) ABSTRACT

The present disclosure is a generator with balanced and controlled attractions among magnets and iron cores. Therefore, this generator has minimal to non-existent rotation resistance on the axis when it is rotated to produce electricity. The magnet fields formed among iron cores with coils are not affected by the balanced attractions among magnets and iron cores. As a result, this generator requires much less mechanical energy input to run for electricity output.

22 Claims, 29 Drawing Sheets

Fig. 24        Fig. 25
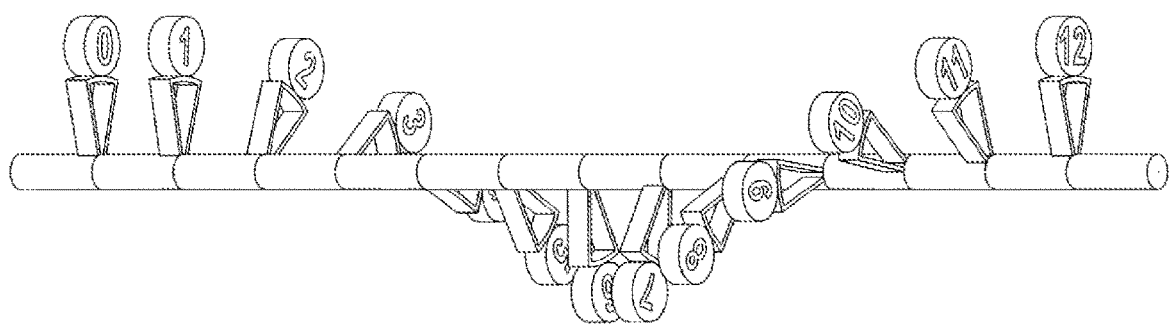
Fig. 26
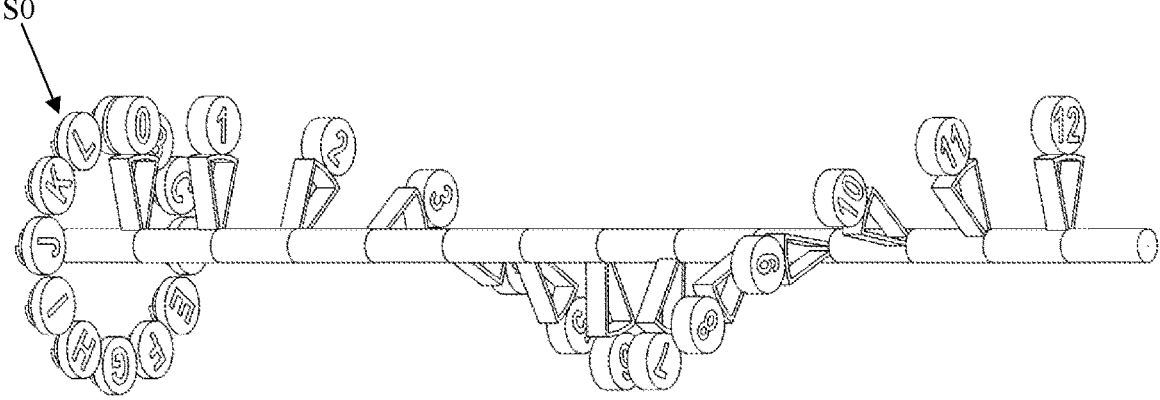
Fig. 27

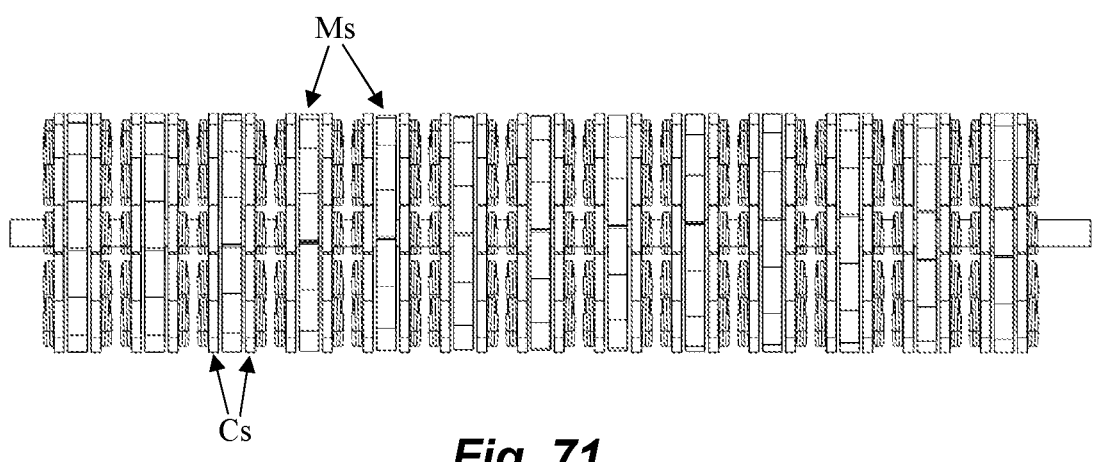
Fig. 71
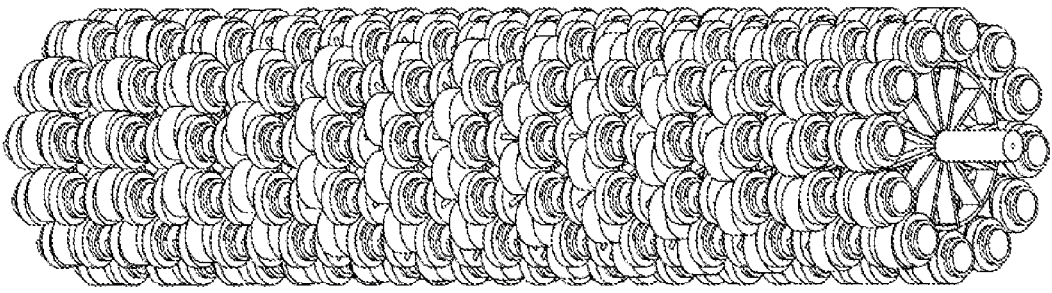
Fig. 72
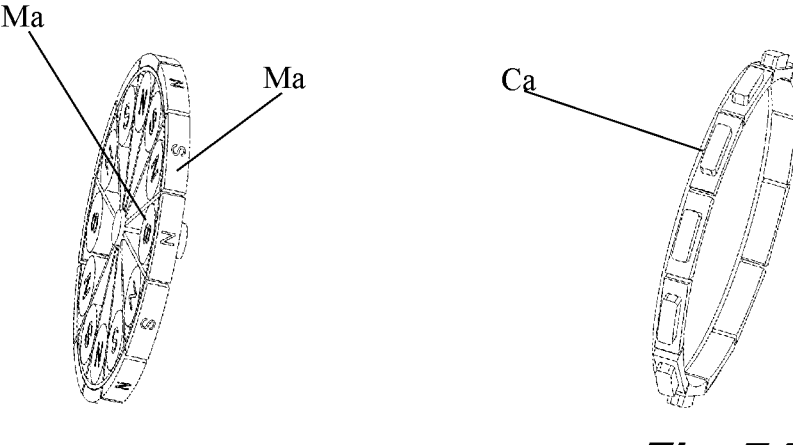
Fig. 73                    Fig. 74

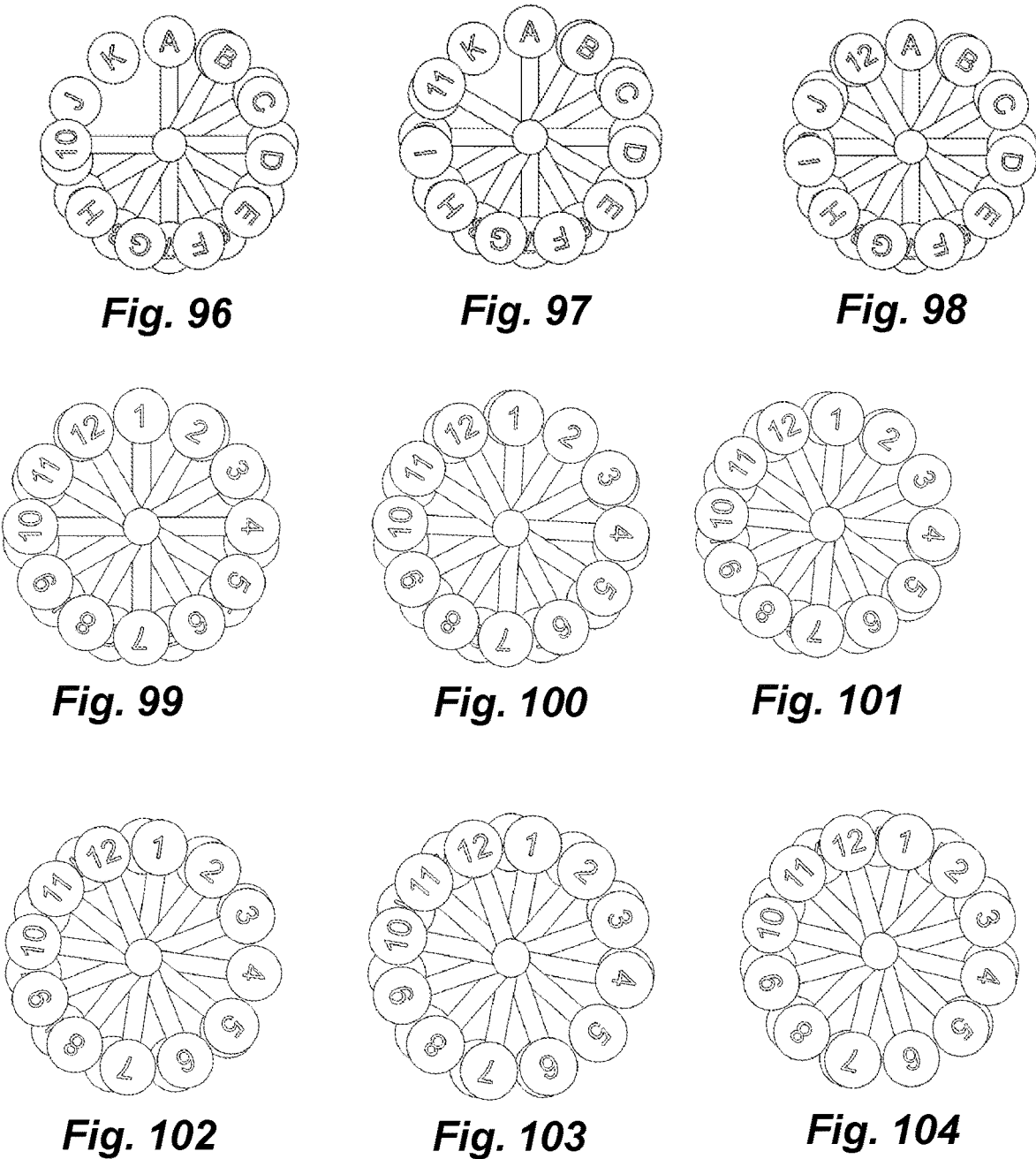
Fig. 96  Fig. 97  Fig. 98
Fig. 99  Fig. 100  Fig. 101
Fig. 102  Fig. 103  Fig. 104

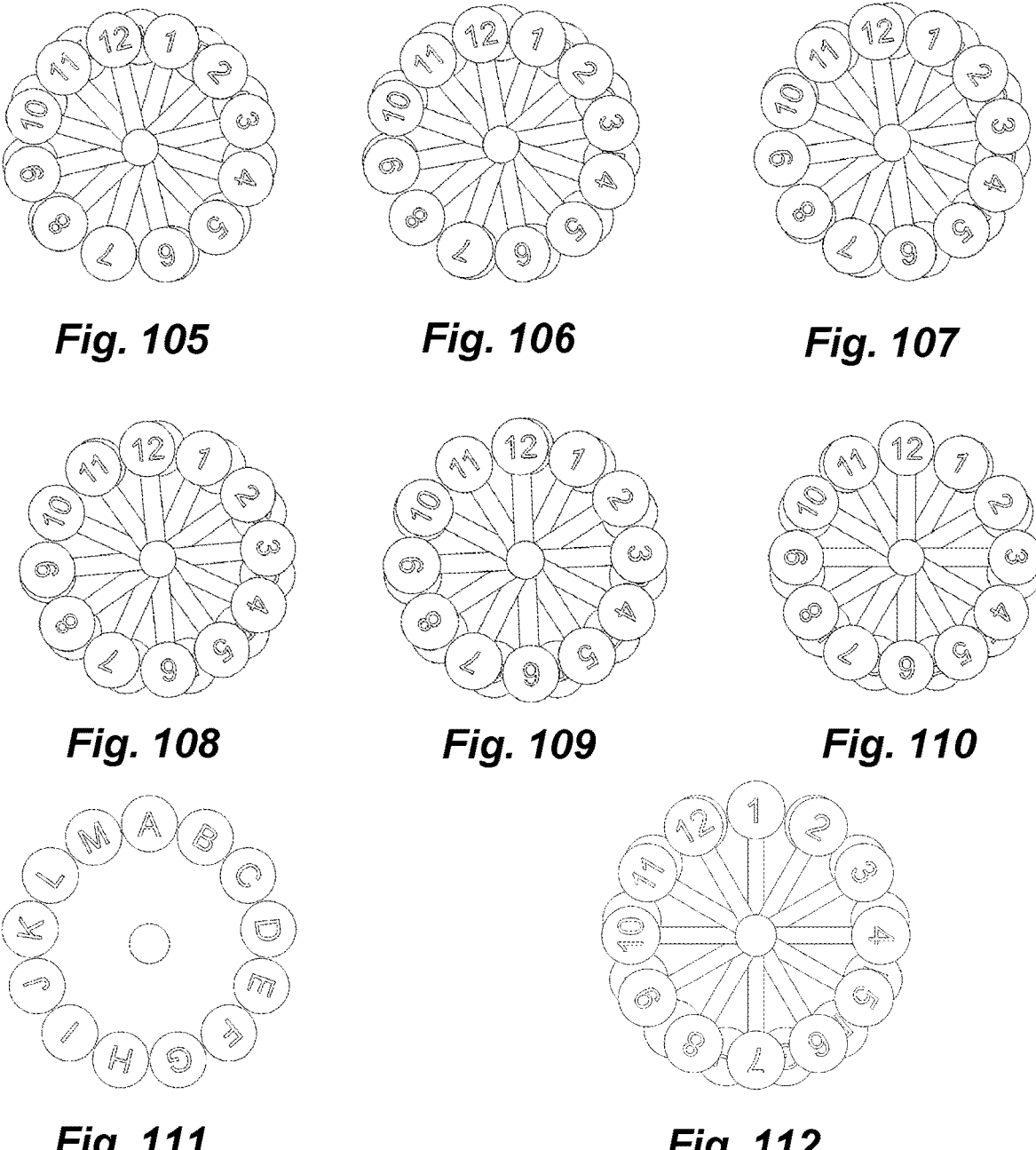
*Fig. 105*          *Fig. 106*          *Fig. 107*
*Fig. 108*          *Fig. 109*          *Fig. 110*
*Fig. 111*                    *Fig. 112*

| Magnet number | Degrees of Iron Core segment | Degrees of Magnet | Degree of Magnet Section | Degrees of Magnet | Degree of Magnet Section | Degrees of Magnet | Degree of Magnet Section | Degrees of Magnet | Degree of Magnet Section |
|---|---|---|---|---|---|---|---|---|---|
| 0 | 0 | 0.0000 | 0.0000 | 2.3077 | 2.3077 | 4.6154 | 4.6154 | 6.9231 | 6.9231 |
| 1 | 0 | 2.3077 | 2.3077 | 4.6154 | 4.6154 | 6.9231 | 6.9231 | 9.2308 | 9.2308 |
| 2 | 30 | 34.6154 | 4.6154 | 36.9231 | 6.9231 | 39.2308 | 9.2308 | 41.5385 | 11.5385 |
| 3 | 60 | 66.9231 | 6.9231 | 69.2308 | 9.2308 | 71.5385 | 11.5385 | 73.8462 | 13.8462 |
| 4 | 90 | 99.2308 | 9.2308 | 101.5385 | 11.5385 | 103.8462 | 13.8462 | 106.1539 | 16.1539 |
| 5 | 120 | 131.5385 | 11.5385 | 133.8462 | 13.8462 | 136.1539 | 16.1539 | 138.4616 | 18.4616 |
| 6 | 150 | 163.8462 | 13.8462 | 166.1539 | 16.1539 | 168.4616 | 18.4616 | 170.7693 | 20.7693 |
| 7 | 180 | 196.1539 | 16.1539 | 198.4616 | 18.4616 | 200.7693 | 20.7693 | 203.0770 | 23.0770 |
| 8 | 210 | 228.4616 | 18.4616 | 230.7693 | 20.7693 | 233.0770 | 23.0770 | 235.3847 | 25.3847 |
| 9 | 240 | 260.7693 | 20.7693 | 263.0770 | 23.0770 | 265.3847 | 25.3847 | 267.6924 | 27.6924 |
| 10 | 270 | 293.0770 | 23.0770 | 295.3847 | 25.3847 | 297.6924 | 27.6924 | 300.0001 | 0.0000 |
| 11 | 300 | 325.3847 | 25.3847 | 327.6924 | 27.6924 | 330.0000 | 0.0000 | 332.3077 | 2.3077 |
| 12 | 330 | 357.6924 | 27.6924 | 0.0000 | 0.0000 | 2.3077 | 2.3077 | 4.6154 | 4.6154 |

| Degrees of Magnet | Degree of Magnet Section | Degrees of Magnet | Degree of Magnet Section | Degrees of Magnet | Degree of Magnet Section | Degrees of Magnet | Degree of Magnet Section | Degrees of Magnet | Degree of Magnet Section |
|---|---|---|---|---|---|---|---|---|---|
| 9.2308 | 9.2308 | 11.5385 | 11.5385 | 13.8462 | 13.8462 | 16.1539 | 16.1539 | 18.4616 | 18.4616 |
| 11.5385 | 11.5385 | 13.8462 | 13.8462 | 16.1539 | 16.1539 | 18.4616 | 18.4616 | 20.7693 | 20.7693 |
| 43.8462 | 13.8462 | 46.1539 | 16.1539 | 48.4616 | 18.4616 | 50.7693 | 20.7693 | 53.0770 | 23.0770 |
| 76.1539 | 16.1539 | 78.4616 | 18.4616 | 80.7693 | 20.7693 | 83.0770 | 23.0770 | 85.3847 | 25.3847 |
| 108.4616 | 18.4616 | 110.7693 | 20.7693 | 113.0770 | 23.0770 | 115.3847 | 25.3847 | 117.6924 | 27.6924 |
| 140.7693 | 20.7693 | 143.0770 | 23.0770 | 145.3847 | 25.3847 | 147.6924 | 27.6924 | 150.0001 | 0.0000 |
| 173.0770 | 23.0770 | 175.3847 | 25.3847 | 177.6924 | 27.6924 | 180.0001 | 0.0000 | 182.3078 | 2.3077 |
| 205.3847 | 25.3847 | 207.6924 | 27.6924 | 210.0001 | 0.0000 | 212.3078 | 2.3077 | 214.6155 | 4.6154 |
| 237.6924 | 27.6924 | 240.0001 | 0.0000 | 242.3078 | 2.3077 | 244.6155 | 4.6154 | 246.9232 | 6.9231 |
| 270.0001 | 0.0000 | 272.3078 | 2.3077 | 274.6155 | 4.6154 | 276.9232 | 6.9231 | 279.2309 | 9.2308 |
| 302.3078 | 2.3077 | 304.6155 | 4.6154 | 306.9232 | 6.9231 | 309.2309 | 9.2308 | 311.5386 | 11.5385 |
| 334.6154 | 4.6154 | 336.9231 | 6.9231 | 339.2308 | 9.2308 | 341.5385 | 11.5385 | 343.8462 | 13.8462 |
| 6.9231 | 6.9231 | 9.2308 | 9.2308 | 11.5385 | 11.5385 | 13.8462 | 13.8462 | 16.1539 | 16.1539 |

| Degrees of Magnet | Degree of Magnet Section | Degrees of Magnet | Degree of Magnet Section | Degrees of Magnet | Degree of Magnet Section | Degrees of Magnet | Degree of Magnet Section |
|---|---|---|---|---|---|---|---|
| 20.7693 | 20.7693 | 23.0770 | 23.0770 | 25.3847 | 25.3847 | 27.6924 | 27.6924 |
| 23.0770 | 23.0770 | 25.3847 | 25.3847 | 27.6924 | 27.6924 | 0.0000 | 0.0000 |
| 55.3847 | 25.3847 | 57.6924 | 27.6924 | 60.0001 | 0.0000 | 62.3078 | 2.3077 |
| 87.6924 | 27.6924 | 90.0001 | 0.0000 | 92.3078 | 2.3077 | 94.6155 | 4.6154 |
| 120.0001 | 0.0000 | 122.3078 | 2.3077 | 124.6155 | 4.6154 | 126.9232 | 6.9231 |
| 152.3078 | 2.3077 | 154.6155 | 4.6154 | 156.9232 | 6.9231 | 159.2309 | 9.2308 |
| 184.6155 | 4.6154 | 186.9232 | 6.9231 | 189.2309 | 9.2308 | 191.5386 | 11.5385 |
| 216.9232 | 6.9231 | 219.2309 | 9.2308 | 221.5386 | 11.5385 | 223.8463 | 13.8462 |
| 249.2309 | 9.2308 | 251.5386 | 11.5385 | 253.8463 | 13.8462 | 256.1540 | 16.1539 |
| 281.5386 | 11.5385 | 283.8463 | 13.8462 | 286.1540 | 16.1539 | 288.4617 | 18.4616 |
| 313.8463 | 13.8462 | 316.1540 | 16.1539 | 318.4617 | 18.4616 | 320.7694 | 20.7693 |
| 346.1539 | 16.1539 | 348.4616 | 18.4616 | 350.7693 | 20.7693 | 353.0770 | 23.0770 |
| 18.4616 | 18.4616 | 20.7693 | 20.7693 | 23.0770 | 23.0770 | 25.3847 | 25.3847 |

Chart 1

*Fig. 115*

| Magnet number | Degrees of Iron Core segment | Degrees of Magnet | Degrees of Magnet Section | Degrees of Magnet | Degrees of Magnet Section | Degrees of Magnet | Degrees of Magnet Section | Degrees of Magnet | Degrees of Magnet Section |
|---|---|---|---|---|---|---|---|---|---|
| 1 | 0 | 0 | 0 | 2.7273 | -2.7273 | 5.4546 | -5.4546 | 8.1819 | -8.1819 |
| 2 | 32.7273 | 30 | 2.7273 | 32.7273 | 0 | 35.5456 | -2.7273 | 38.1819 | -5.4546 |
| 3 | 65.4546 | 60 | 5.4546 | 62.7273 | 2.7273 | 65.4546 | 0 | 68.1819 | -2.7273 |
| 4 | 98.1819 | 90 | 8.1819 | 92.7273 | 5.4546 | 95.4546 | 2.7273 | 98.1819 | 0 |
| 5 | 130.9092 | 120 | 10.9092 | 122.7273 | 8.1819 | 125.4546 | 5.4546 | 128.1819 | 2.7273 |
| 6 | 163.6365 | 150 | 13.6365 | 152.7273 | 10.9092 | 155.4546 | 8.1819 | 158.1819 | 5.4546 |
| 7 |  | 180 | middle/IC | 182.7273 | 13.6365 | 185.4546 | 10.9092 | 188.1819 | 8.1819 |
| 8 | 196.3638 | 210 | -13.6362 | 212.7273 | middle/IC | 215.4546 | 13.6365 | 218.1819 | 10.9092 |
| 9 | 229.0911 | 240 | -10.9089 | 242.7273 | -13.6362 | 245.4546 | middle/IC | 248.1819 | 13.6365 |
| 10 | 261.8184 | 270 | -8.1816 | 272.7273 | -10.9089 | 275.4546 | -13.6362 | 278.1819 | middle/IC |
| 11 | 294.5457 | 300 | -5.4543 | 302.7273 | -8.1816 | 305.4546 | -10.9089 | 308.1819 | -13.6362 |
| 12 | 327.2730 | 330 | -2.7270 | 332.7273 | -5.4543 | 335.4546 | -8.1816 | 338.1819 | -10.9089 |

| Degrees of Magnet | Degrees of Magnet Section | Degrees of Magnet | Degrees of Magnet Section | Degrees of Magnet | Degrees of Magnet Section | Degrees of Magnet | Degrees of Magnet Section |
|---|---|---|---|---|---|---|---|
| 10.9092 | -10.9092 | 13.6365 | -13.3662 | 16.3638 | middle/IC | 19.0911 | 13.6362 |
| 40.9092 | -8.1819 | 43.6365 | -10.9092 | 46.3638 | -13.3662 | 49.0911 | middle/IC |
| 70.9092 | -5.4546 | 73.6365 | -8.1819 | 76.3638 | -10.9092 | 79.0911 | -13.6365 |
| 100.9092 | -2.7273 | 103.6365 | -5.4546 | 106.3638 | -8.1819 | 109.0911 | -10.9092 |
| 130.9092 | 0 | 133.6365 | -2.7273 | 136.3638 | -5.4546 | 139.0911 | -8.1819 |
| 160.9092 | 2.7273 | 163.6365 | 0 | 166.3638 | -2.7273 | 169.0911 | -5.4546 |
| 190.9092 | 5.4546 | 193.6365 | 2.7273 | 196.3638 | 0 | 199.0911 | -2.7273 |
| 220.9092 | 8.1819 | 223.6365 | 5.4546 | 226.3638 | 2.7273 | 229.0911 | 0 |
| 250.9092 | 10.9092 | 253.6365 | 8.1819 | 256.3638 | 5.4546 | 259.0911 | 2.7273 |
| 280.9092 | 13.6365 | 283.6365 | 10.9092 | 286.3638 | 8.1819 | 289.0911 | 5.4546 |
| 310.9092 | middle/IC | 313.6365 | 13.6365 | 316.3638 | 10.9092 | 319.0911 | 8.1819 |
| 340.9092 | -13.6362 | 343.6365 | middle/IC | 346.3638 | 13.6365 | 349.0911 | 10.9092 |

| Degrees of Magnet | Degrees of Magnet Section | Degrees of Magnet | Degrees of Magnet Section | Degrees of Magnet | Degrees of Magnet Section | Degrees of Magnet | Degrees of Magnet Section |
|---|---|---|---|---|---|---|---|
| 21.8184 | 10.9092 | 24.5457 | 8.1819 | 27.2730 | 5.4546 | 30.0003 | 2.7273 |
| 51.8184 | 13.6362 | 54.5757 | 10.9092 | 57.2730 | 8.1819 | 60.0003 | 5.4546 |
| 81.8184 | middle/IC | 84.5757 | 13.6365 | 87.2730 | 10.9092 | 90.0003 | 8.1819 |
| 111.8184 | -13.6365 | 114.5457 | middle/IC | 117.2730 | 13.6365 | 120.0003 | 10.9092 |
| 141.8184 | -10.9092 | 144.5457 | -13.6362 | 147.2730 | middle/IC | 150.0003 | 13.6365 |
| 171.8184 | -8.1819 | 174.5457 | -10.9089 | 177.2730 | -13.6362 | 180.0003 | middle/IC |
| 201.8184 | -5.4546 | 204.5457 | -8.1816 | 207.2730 | -10.9089 | 210.0003 | -13.6362 |
| 231.8184 | -2.7273 | 234.5457 | -5.4543 | 237.2730 | -8.1816 | 240.0003 | -10.9089 |
| 261.8184 | 0 | 264.5457 | -2.7273 | 267.2730 | -5.4543 | 270.0003 | -8.1816 |
| 291.8184 | 2.7273 | 294.5457 | 0 | 297.2730 | -2.7273 | 300.0003 | -5.4543 |
| 321.8184 | 5.4546 | 324.5457 | 2.7273 | 327.2730 | 0 | 330.0003 | -2.7273 |
| 351.8184 | 8.1819 | 354.5457 | 5.4546 | 357.2730 | 2.7273 | 360.0003 | 0 |

Chart 2

(Positive degrees are clockwise and negative degrees are counterclockwise)
(middle/IC means the magnet is in the middle of two adjacent iron cores)

*Fig. 116*

GENERATOR WITH MINIMAL TO NON-EXISTENT ROTATION RESISTANCE THROUGH CONTROLLED ATTRACTIONS AMONG ALL MAGNETS AND IRON CORES

BACKGROUND

Technical Field

The present disclosure relates to the field of generators. Specifically, the present disclosure relates to improving the efficiency of generator function through controlled attractions among all the magnets and iron cores to reach equilibrium. As a result, the generator requires much less mechanical energy to rotate its axis and functions with higher efficiency.

Description of the Related Art

Generators can range from a small vehicle generator to a big power plant. No matter the size, a generator needs a strong external mechanical power to rotate the axis of the generator to produce electricity.

There are two types of common motor generators: ones with iron cores or ones without iron cores. The coreless generator is easier to rotate because it does not have attraction forces among the magnets and iron cores; however, this type of generator needs to use strong magnets with more complex winding wire configuration. On the other hand, a generator with iron cores has a higher magnetic flux density but it requires a strong external power to push or rotate the axis due to the attractions among magnets and iron cores.

BRIEF SUMMARY

Inventor recognizes that a generator with balanced attractions among all of its magnets and iron cores will result in minimal to non-existent rotation resistance, thus, allowing it to rotate as easily as a coreless generator with much better energy output.

The present disclosure creates a generator with minimal to non-existent resistance when rotating the axis of the generator. In other words, this generator will use much less mechanical energy to produce more electricity.

The magnets and iron cores for this generator can be arranged to have either the same or different numbers in the rotation circle. The first patten is the rotation circle with the same number of magnets and iron cores. The second patten is the rotation circle with the different number of magnets and iron cores.

The present disclosure creates a generator that produces more electricity with more magnets and iron cores from multiple directions such as the front, back, top, or bottom sides of the magnets.

The present disclosure creates a generator that can be set to use permanent magnets, electromagnets, or both.

In the present disclosure, the shapes of magnets and iron cores can be any shape as long as they can be arranged inside the generator with balanced attractions among the magnets and iron cores.

In some implementations of the present disclosure, generators can generate either direct current (DC) or alternating current (AC) power.

In some implementations of the present disclosure, the number of magnets and iron cores of generators are flexible to be increased or decreased by following the generator sizes, requirements, and designs.

The generators of the present disclosure can be run by engines, turbine machines, wind flows, water flows, thermal or any pushing mechanical energy.

BRIEF DESCRIPTION OF THE SEVERAL VIEWS OF THE DRAWINGS

FIGS. 20-24 show in various views a core set of a generator.

FIGS. 25-64 show positions of one or more magnet groups with respect to one or more core sets.

FIGS. 65-72 show in various views of relative positions between one or more core sets and adjacent magnets of the twelve magnet groups.

FIG. 73 and FIG. 74 show that this generator can also add square-shaped magnet and iron cores around the circumference of the current magnet groups.

FIGS. 87-98 show relative position of each of 12 magnets of a magnet group with respect to respective iron cores of 12 iron core sets.

FIGS. 99-110 show in a front view various balancing points when a magnet is fully aligned with a respective iron core.

FIGS. 111 and 112 show an example configuration in which a magnet group includes 12 magnets and an iron core set includes 13 iron cores.

FIG. 115 is a chart that shows the degrees and values for the magnets and iron cores in a 30-degrees segment in an example embodiment.

FIG. 116 is a chart that shows the details of the angles of the magnets with respect to the respective iron core sets in another example embodiment.

DETAILED DESCRIPTION

Figure 1:
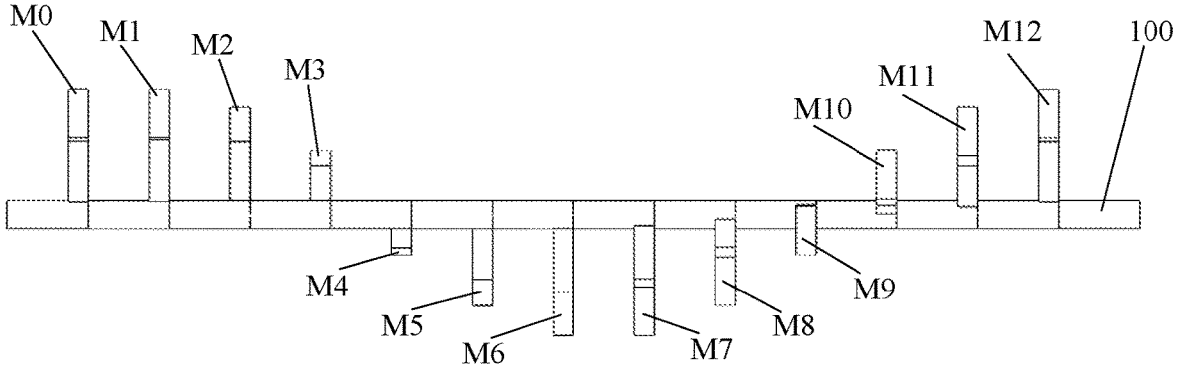
FIGS. 1-19 show in various views of one or more magnet groups each with thirteen magnets helically arranged along an axis of a generator.

This disclosure uses the degrees on a circle to measure and match the attractions among all magnets and iron cores. As an illustrative example for easiness of understanding, all the magnets and iron cores described herein are the same diameter and have the same attractions.

The disclosure is directed to a generator solution. The generator includes an axis and a plurality of groups of magnets arranged along the axis. In an implementation, each of the plurality of groups includes a same odd number N of magnets ($M_0$-$M_{N-1}$) arranged helically along the axis. The N magnets in each magnet group are arranged with angles determined based on the following equation:

$$\theta_n = \theta_0 + n * \left(\frac{360}{(N-1)*N}\right) + (n-1)*\left(\frac{360}{(N-1)}\right), \quad (1)$$

where n=(1, N−1), inclusive; $\theta_n$ is the angle of magnet $M_0$; $\theta_n$ is the angle of magnet $M_n$.

For example, when the first magnet $M_0$ has an angle of 0 degrees, a second magnet $M_1$ of the N magnets that is immediately adjacent to the first magnet $M_0$ has an angle of $$\left(\frac{360}{(N-1)*N}\right)$$

degrees, and a third magnet $M_2$ of the N magnet that is immediately adjacent to the second magnet $M_1$ has an angle of $$2*\left(\frac{360}{(N-1)*N}\right) + \left(\frac{360}{(N-1)}\right)$$

degrees.

The total number of magnet groups is N−1. Each magnet group is arranged with a 360/N−1) degrees angular offset with respect to the immediately adjacent magnet group. For example, the center line of the magnet $M_0$ of the second magnet group will be arranged 360/(N−1) degrees offset from the $M_0$ of the first magnet group in a same rotation plane. As such, there are totally N segments of magnets arranged along the axis. In each magnet segment, there are N−1 magnets arranged in a same rotation plane, orthogonal to the axis, each belonging to one of the N−1 magnet groups. For example, in segment Ms0, there are N−1 magnet $M_0$ of the N−1 magnet groups.

In some implementations, magnets in adjacent magnet groups are of opposite magnetic poles.

The generator also includes N−1 groups of iron cores corresponding to each of the N−1 group of magnets. Each of the N−1 groups of iron cores includes N iron cores ($C_0$-$C_{N-1}$) arranged helically along the axis. In each group of iron core, the N iron cores are arranged with angles determined based on the following equation:

$$\mu_n = \mu_0 + (n-1)*\left(\frac{360}{(N-1)}\right), \quad (2)$$

where n=(1, N−1); $\mu_0$ is the angle of iron core $C_0$; $\mu_n$ is the angle of iron core $C_n$. Each iron core ($C_0$-$C_{N-1}$) in a group of iron cores corresponds to a magnet segment.

The total number of iron core groups is N−1. Each iron core group is arranged with a 360/(N−1) degrees angular offset with respect to the immediately adjacent iron core group. For example, the center line of the iron core $C_0$ of the second iron core group will be arranged 360/(N−1) degrees offset from the iron core $C_0$ of the first iron core group in a same circular plane. As such, there are totally N sets of iron cores arranged along the axis. In each set, there are N−1 iron cores arranged in a same circular plane, orthogonal to the axis, each iron core in a set belonging to one of the N−1 iron core groups. For example, in iron core set S0, there are N−1 first iron cores of each of the N−1 iron core groups. The N sets of iron cores are identical to one another and parallel to one another.

The iron core sets each corresponds to a magnet segment and is arranged on a side of the corresponding magnet segment, referred to as right side or left side for descriptive purposes herein. The circular plane of an iron core set is substantially parallel to a rotation plane of a corresponding magnet segment.

An angle of an iron core in the set of iron cores is also called an angle of the segment or segment angle. In a case that the $C_0$ of the first iron core group has an angle of 0 degrees, $\mu_0=0$, the angle of the segment of the rest of the segments equals to $$(n-1)*\left(\frac{360}{(N-1)}\right),$$

where n=(1, N−1), inclusive.

In a case that the first segment of magnets are each fully aligned with the corresponding first set of iron cores, the other segments of magnets are all misaligned with the corresponding sets of iron cores. The misalignment angle is $$n*\left(\frac{360}{(N-1)*N}\right)$$

degrees, where n=(1, N−1), inclusive, and n is determined based on a distance of the segment of magnets from the first segment of magnets. For example, for the second segment of magnets that is immediately adjacent to the first segment of magnets, n=1, and the misalignment angle between magnets in the second segments of magnets to the corresponding iron cores of the second set of iron cores will be $$\left(\frac{360}{(N-1)*N}\right)$$

degrees. For the third segment of magnets that is immediately adjacent to the second segment of magnets, which is two segments away from the first segment of magnets, n=2, and the misalignment angle between magnets in the third segments of magnets to the corresponding iron cores of the third set of iron cores will be $$2*\left(\frac{360}{(N-1)*N}\right)$$

degrees. For the fourth segment of magnets that is immediately adjacent to the third segment of magnets, which is three segments away from the first segment of magnets, n=3, and the misalignment angle between magnets in the fourth segments of magnets to the corresponding iron cores of the fourth set of iron cores will be $$3*\left(\frac{360}{(N-1)*N}\right)$$

degrees.

In the description herein, the generator will be described using an example implementation of N being 13.

FIG. 1 shows, in a side view, a first magnet group with thirteen magnets $M_0$ . . . $M_{12}$ that are helically arranged along an axis 100.

Figure 2:
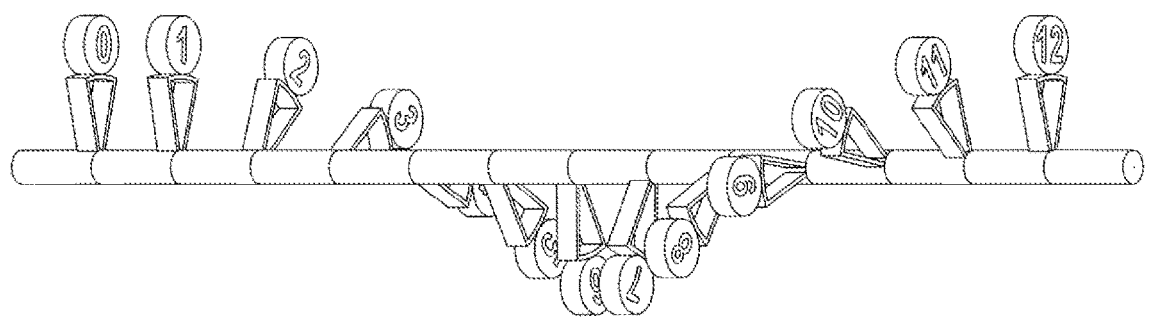

FIG. 2 shows, in a perspective view, the first magnet group that has thirteen magnets $M_0$ . . . $M_{12}$ helically arranged along the axis 100.

Figure 3:
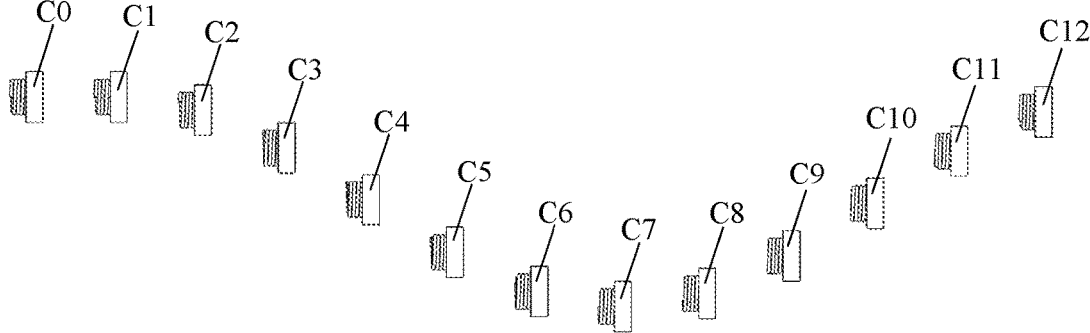

FIG. 3 shows the side view of a first iron core group with thirteen iron cores $C_0$ . . . $C_{12}$ that are helically arranged along the axis 100 and match with the magnets of first magnet group. Note that the angles of some of the magnets $M_0$ . . . $M_{12}$ in the first magnet group are different from the angles of the iron cores $C_0$ . . . $C_{12}$ in the first iron core group. When $M_0$ is aligned with $C_0$, each of the magnets $M_1$ . . . $M_{12}$ misaligns with the corresponding iron core $C_1$ . . . $C_{12}$ by an angle that equals to:

$$n * \left( \frac{360}{(N-1)*N} \right), \tag{3}$$

For example, for N=13, when $M_0$ is aligned with $C_0$, $M_1$ misaligns with $C_1$ for 2.3077 degrees, $M_2$ misaligns with $C_2$ for 4.6154 degrees, $M_3$ misaligns with $C_3$ for 6.9231 degrees, $M_4$ misaligns with $C_4$ for 9.2308 degrees, $M_5$ misaligns with $C_5$ for 11.5385 degrees, $M_6$ misaligns with $C_6$ for 13.8462 degrees, $M_7$ misaligns with $C_7$ for 16.1539 degrees, $M_8$ misaligns with $C_8$ for 18.4616 degrees, $M_9$ misaligns with $C_9$ for 20.7693 degrees, $M_{10}$ misaligns with $C_{10}$ for 23.0770 degrees, $M_{11}$ misaligns with $C_{11}$ for 25.3847 degrees, and $M_{12}$ misaligns with $C_{12}$ for 27.6924 degrees.

Figure 4:
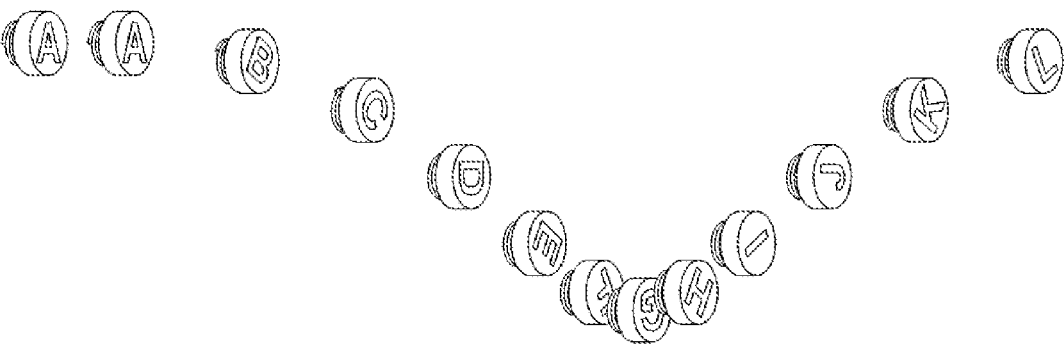

FIG. 4 shows, in perspective view, the first iron core group that has thirteen iron cores with the letters from A, A, B, C, D, E, F, G, H, I, J, K, and L. The iron cores $C_0$ and $C_1$ have a same angle, and are thus both marked with a same letter, here A, for descriptive purposes. Assuming $C_0$ and $C_1$ are arranged with an angle of 0 degrees, $C_2$ is arranged with an angle of 30 degrees, $C_3$ is arranged with an angle of 60 degrees, $C_4$ is arranged with an angle of 90 degrees, $C_5$ is arranged with an angle of 120 degrees, $C_6$ is arranged with an angle of 150 degrees, $C_7$ is arranged with an angle of 180 degrees, $C_8$ is arranged with an angle of 210 degrees, $C_9$ is arranged with an angle of 240 degrees, $C_{10}$ is arranged with an angle of 270 degrees, $C_{11}$ is arranged with an angle of 300 degrees, $C_{12}$ is arranged with an angle of 330 degrees.

In the description herein, the letters A, B, C, D, E, F, G, H, I, J, K, and L indicates an angle of an iron core, for descriptive purposes. In the example of N=13, A refers to an iron core arranged with an angle of 0 degrees, B refers to an iron core arranged with an angle of 30 degrees, C refers to an iron core arranged with an angle of 60 degrees, D refers to an iron core arranged with an angle of 90 degrees, E refers to an iron core arranged with an angle of 120 degrees, F refers to an iron core arranged with an angle of 150 degrees, G refers to an iron core arranged with an angle of 180 degrees, H refers to an iron core arranged with an angle of 210 degrees, I refers to an iron core arranged with an angle of 240 degrees, J refers to an iron core arranged with an angle of 270 degrees, K refers to an iron core arranged with an angle of 300 degrees, and L refers to an iron core arranged with an angle of 330 degrees.

In other groups of iron cores, the same letters A, B, C, D, E, F, G, H, I, J, K, and L are used to refer to the iron cores of the respective angles. In any iron core group, the iron cores having a same angle will be referred to using a same letter.

Figure 5:
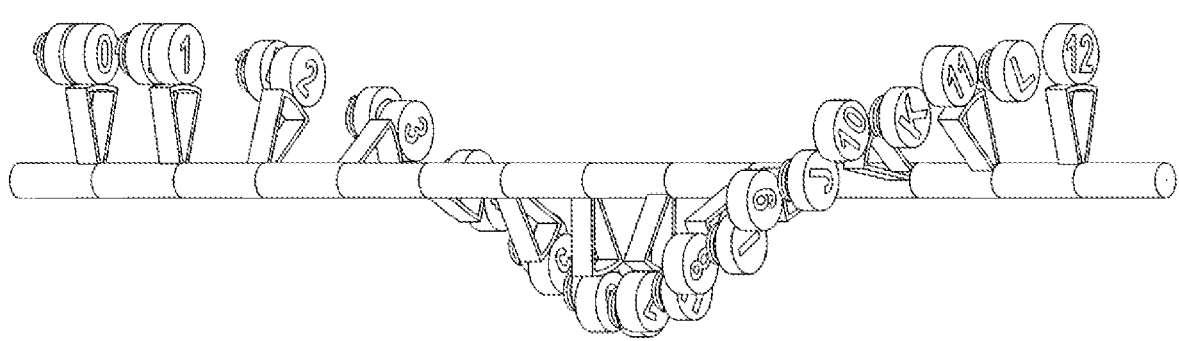

FIG. 5 shows, from a perspective view, the first magnet group and the first iron core group together. As shown in FIG. 5, as an illustrative example, magnet $M_0$ is aligned with iron core $C_0$, and magnets $M_1$-$M_{12}$ each misaligns with the corresponding iron cores $C_1$-$C_{12}$ for various degrees, referred to as misalignment angles. Each misalignment angle equals to $$n * \left( \frac{360}{(N-1)*N} \right)$$

degrees, here n*2.3077 degrees. Specifically, $M_1$ misaligned with iron core $C_1$ for 2.3077 degrees; $M_2$ misaligned with iron core $C_2$ for 4.6154 degrees; $M_3$ misaligned with iron core $C_3$ for 6.9231 degrees; $M_4$ misaligned with iron core $C_4$ for 9.2308 degrees; $M_5$ misaligned with iron core $C_5$ for 11.5385 degrees; $M_6$ misaligned with iron core $C_6$ for 13.8462 degrees; $M_7$ misaligned with iron core $C_7$ for 16.1539 degrees; $M_8$ misaligned with iron core $C_8$ for 18.4616 degrees; $M_9$ misaligned with iron core $C_9$ for 20.7693 degrees; $M_{10}$ misaligned with iron core $C_{10}$ for 23.0770 degrees; $M_{11}$ misaligned with iron core $C_{11}$ for 25.3847 degrees; and $M_{12}$ misaligned with iron core $C_{12}$ for 27.6924 degrees.

As can be seen, except for the first magnet $M_0$ that is aligned with iron core $C_0$, the rest of 12 magnets include 6 pairs of magnets whose misalignment angles meets a complimentary relationship of $$\phi1 + \phi2 = * \frac{360}{(N-1)},$$

here $\phi1 + \phi2 = 30$, where $\phi1$ and $\phi2$ are misalignment angles of the magnets in a pair. For example, $M_{12}$ has a misalignment angle of 27.6924 degrees and $M_1$ has a misalignment angle of 2.3077 degrees. 27.6924+2.3077=30.

Figure 6:
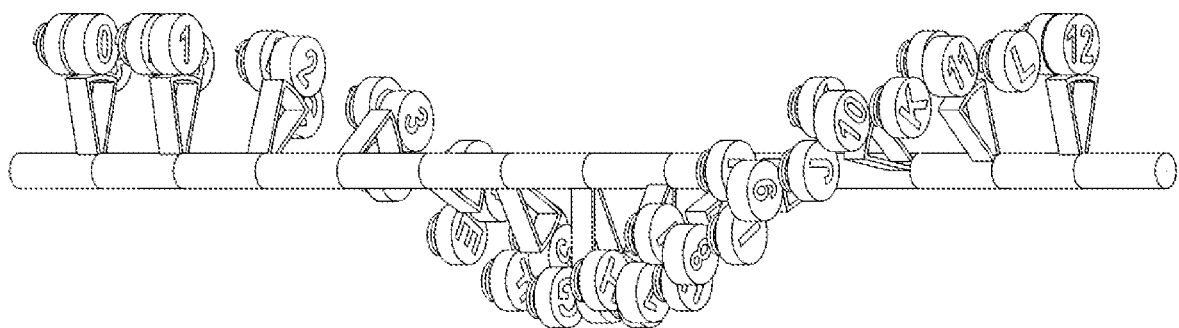

FIG. 6 shows, from a perspective view, the first magnet group, the first iron core group, and the second iron core group together. The iron cores $C_0$, $C_1$, $C_2$, $C_3$, $C_4$, $C_5$, $C_6$, $C_7$, $C_8$, $C_9$, $C_{10}$, $C_{11}$, and $C_{12}$ of the second iron core group are marked with letters B, B, C, D, E, F, G, H, I, J, K, L, and A. That is, in the second iron core group, iron cores $C_0$ and $C_1$ are arranged with an angle of 30 degrees (referred to as letter B), $C_2$ is arranged with an angle of 60 degrees (referred to as letter C), $C_3$ is arranged with an angle of 90 degrees (referred to as letter D), $C_4$ is arranged with an angle of 120 degrees (referred to as letter E), $C_5$ is arranged with an angle of 150 degrees (referred to as letter F), $C_6$ is arranged with an angle of 180 degrees (referred to as letter G), $C_7$ is arranged with an angle of 210 degrees (referred to as letter H), $C_8$ is arranged with an angle of 240 degrees (referred to as letter I), $C_9$ is arranged with an angle of 270 degrees (referred to as letter J), $C_{10}$ is arranged with an angle of 300 degrees (referred to as letter K), $C_{11}$ is arranged with an angle of 330 degrees (referred to as letter L), $C_{12}$ is arranged with an angle of 360 degrees or 0 degrees (referred to as letter A).

Figure 7:
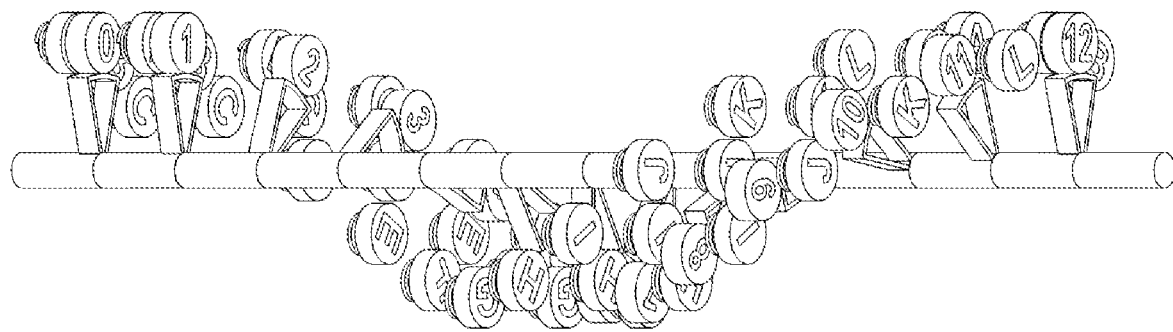

FIG. 7 shows, from a perspective view, the first magnet group, the first iron core group, the second iron core group, and the third iron core group together. The iron cores $C_0$, $C_1$, $C_2$, $C_3$, $C_4$, $C_5$, $C_6$, $C_7$, $C_8$, $C_9$, $C_{10}$, $C_{11}$, and $C_{12}$ of the third iron core group are marked with letters C, C, D, E, F, G, H, I, J, K, L, A and B.

Figure 8:
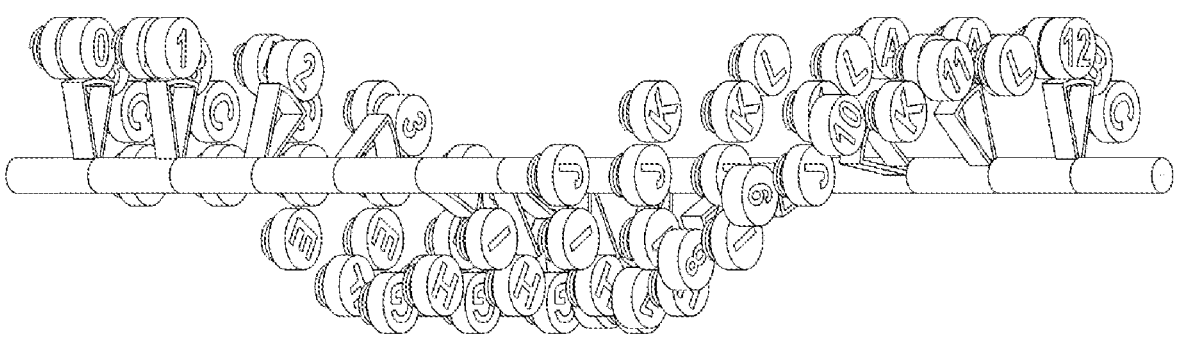

FIG. 8 shows, from a perspective view, the first magnet group, the first iron core group, the second iron core group, the third iron core group, and the fourth iron core group together. The iron cores $C_0$, $C_1$, $C_2$, $C_3$, $C_4$, $C_5$, $C_6$, $C_7$, $C_8$, $C_9$, $C_{10}$, $C_{11}$, and $C_{12}$ of the fourth iron core group are marked with letters D, D, E, F, G, H, I, J, K, L, A, B, and C.

Figure 9:
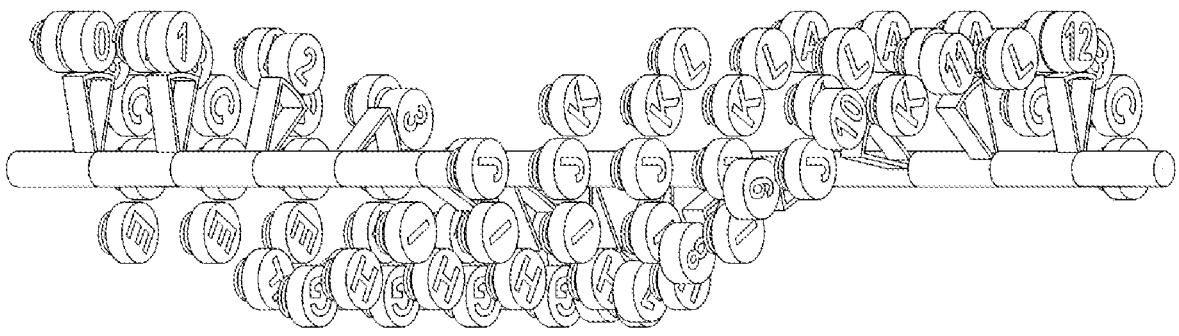

FIG. 9 shows, from a perspective view, the first magnet group, the first iron core group, the second iron core group, the third iron core group, the fourth iron core group, and the fifth iron core group together. The iron cores $C_0$, $C_1$, $C_2$, $C_3$, $C_4$, $C_5$, $C_6$, $C_7$, $C_8$, $C_9$, $C_{10}$, $C_{11}$, and $C_{12}$ of the fifth iron core group are marked with letters E, E, F, G, H, I, J, K, L, A, B, C and D.

Figure 10:
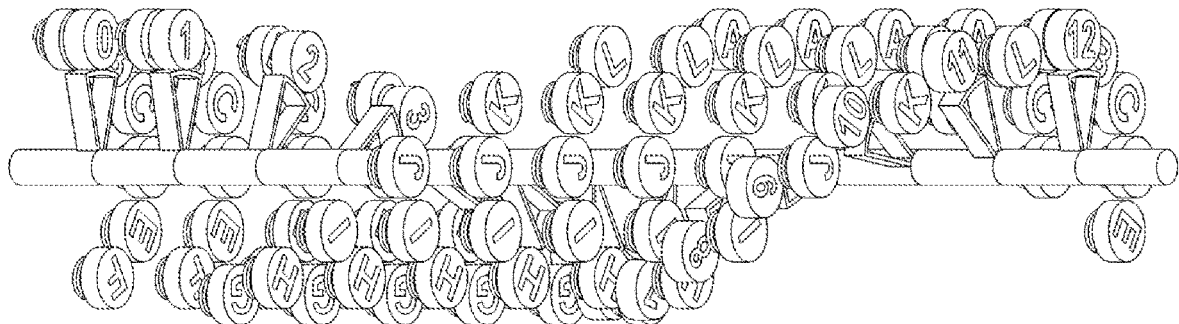

FIG. 10 shows, from a perspective view, the first magnet group, the first iron core group, the second iron core group, the third iron core group, the fourth iron core group, the fifth iron core group, and the sixth iron core group together. The iron cores $C_0$, $C_1$, $C_2$, $C_3$, $C_4$, $C_5$, $C_6$, $C_7$, $C_8$, $C_9$, $C_{10}$, $C_{11}$, and $C_{12}$ of the sixth iron core group are marked with letters F, F, G, H, I, J, K, L, A, B, C, D and E.

Figure 11:
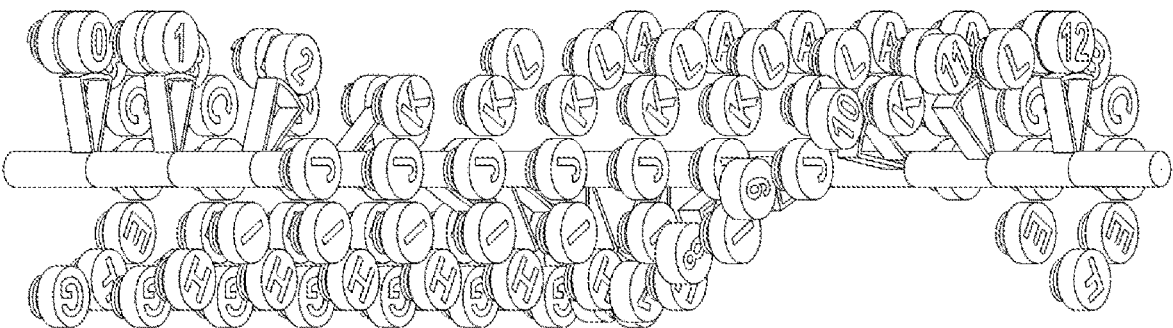

FIG. 11 shows, from a perspective view, the first magnet group, the first iron core group, the second iron core group, the third iron core group, the fourth iron core group, the fifth iron core group, the sixth iron core group, and the seventh iron core group together. The iron cores $C_0$, $C_1$, $C_2$, $C_3$, $C_4$, $C_5$, $C_6$, $C_7$, $C_8$, $C_9$, $C_{10}$, $C_{11}$, and $C_{12}$ of the seventh iron core group are marked with letters G, G, H, I, J, K, L, A, B, C, D, E and F.

Figure 12:
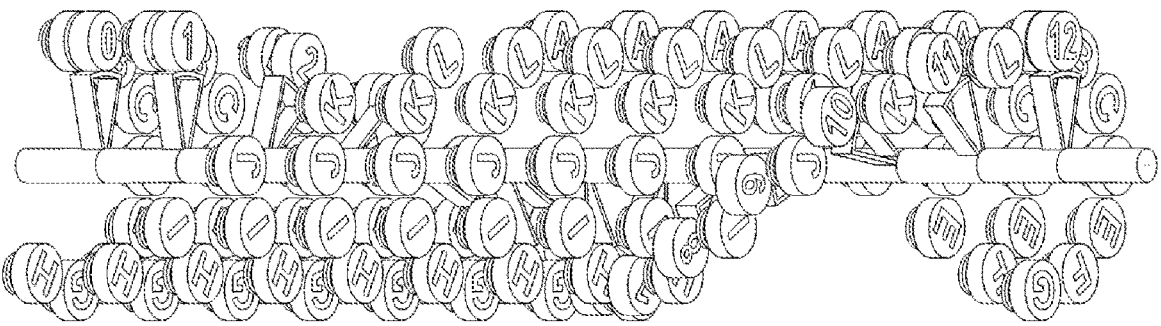

FIG. 12 shows, from a perspective view, the first magnet group, the first iron core group, the second iron core group, the third iron core group, the fourth iron core group, the fifth iron core group, the sixth iron core group, the seventh iron core group, and the eighth iron core group together. The iron cores $C_0$, $C_1$, $C_2$, $C_3$, $C_4$, $C_5$, $C_6$, $C_7$, $C_8$, $C_9$, $C_{10}$, $C_{11}$, and $C_{12}$ of the eighth iron core group are marked with letters H, H, I, J, K, L, A, B, C, D, E, F and G.

Figure 13:
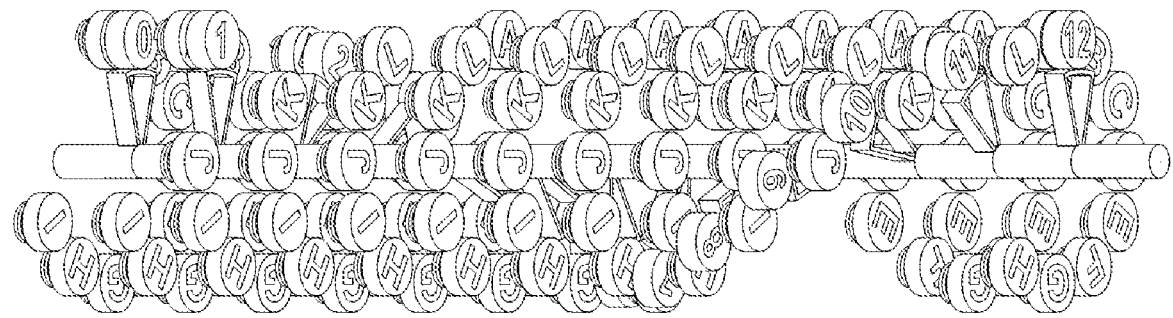

FIG. 13 shows, from a perspective view, the first magnet group, the first iron core group, the second iron core group, the third iron core group, the fourth iron core group, the fifth iron core group, the sixth iron core group, the seventh iron core group, the eighth iron core group, and the ninth iron core group together. The iron cores $C_0$, $C_1$, $C_2$, $C_3$, $C_4$, $C_5$, $C_6$, $C_7$, $C_8$, $C_9$, $C_{10}$, $C_{11}$, and $C_{12}$ of the ninth iron core group are marked with letters I, I, J, K, L, A, B, C, D, E, F, G and H.

Figure 14:
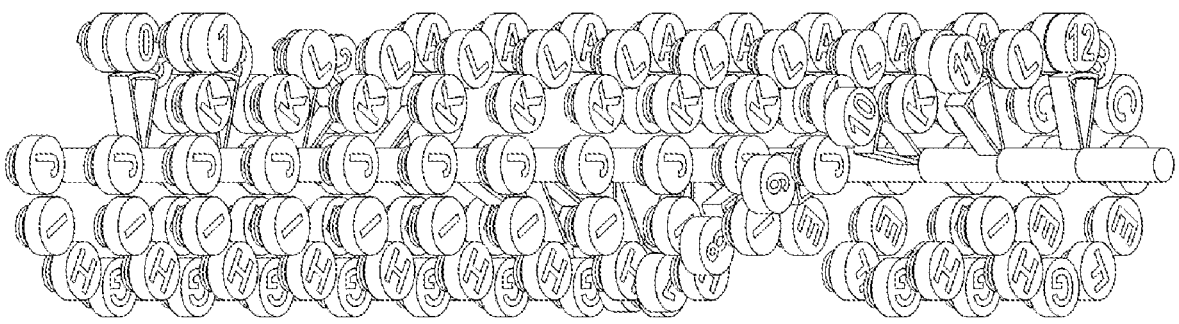

FIG. 14 shows, from a perspective view, the first magnet group, the first iron core group, the second iron core group, the third iron core group, the fourth iron core group, the fifth iron core group, the sixth iron core group, the seventh iron core group, the eighth iron core group, the ninth iron core group, and the tenth iron core group together. The iron cores $C_0$, $C_1$, $C_2$, $C_3$, $C_4$, $C_5$, $C_6$, $C_7$, $C_8$, $C_9$, $C_{10}$, $C_{11}$, and $C_{12}$ of the tenth iron core group are marked with letters J, J, K, L, A, B, C, D, E, F, G, H, and I iron cores.

Figure 15:
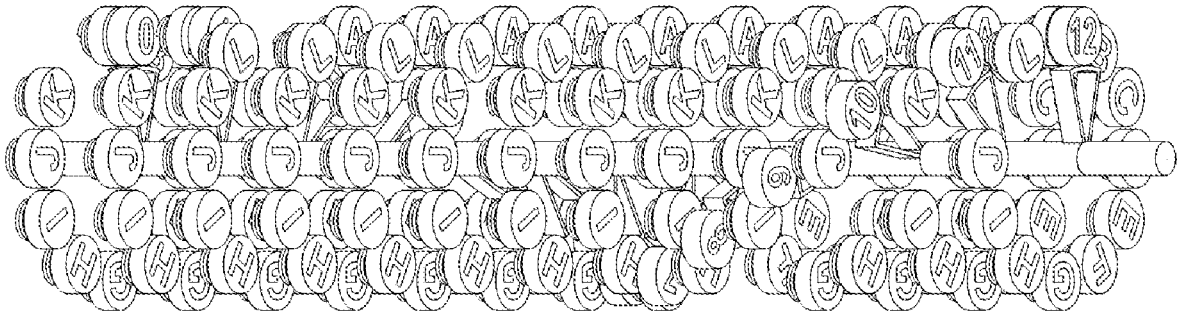

FIG. 15 shows, from a perspective view, the first magnet group, the first iron core group, the second iron core group, the third iron core group, the fourth iron core group, the fifth iron core group, the sixth iron core group, the seventh iron core group, the eighth iron core group, the ninth iron core group, the tenth iron core group, and the eleventh iron core group together. The iron cores $C_0$, $C_1$, $C_2$, $C_3$, $C_4$, $C_5$, $C_6$, $C_7$, $C_8$, $C_9$, $C_{10}$, $C_{11}$, and $C_{12}$ of the eleventh-iron core group are marked with letters K, K, L, A, B, C, D, E, F, G, H, I, and J iron cores.

Figure 16:
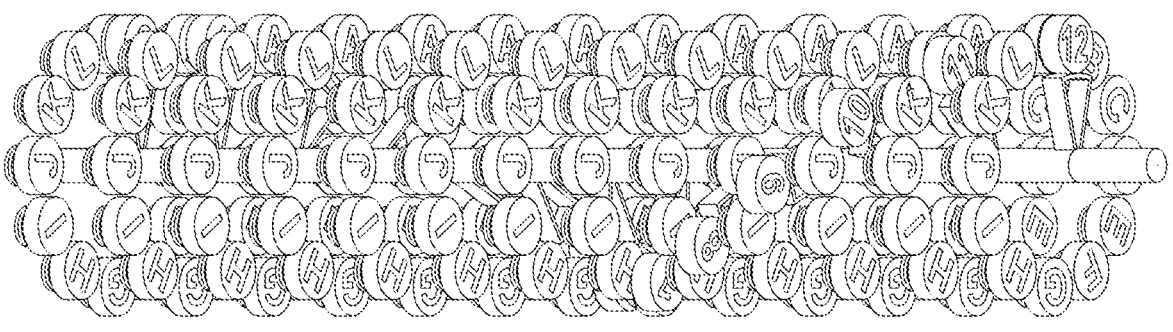

FIG. 16 shows, from a perspective view, the first magnet group, the first iron core group, the second iron core group, the third iron core group, the fourth iron core group, the fifth iron core group, the sixth iron core group, the seventh iron core group, the eighth iron core group, the ninth iron core group, the tenth iron core group, the eleventh iron core group, and the twelfth iron core group together. The iron cores $C_0$, $C_1$, $C_2$, $C_3$, $C_4$, $C_5$, $C_6$, $C_7$, $C_8$, $C_9$, $C_{10}$, $C_{11}$, and $C_{12}$ of the twelfth iron core group are marked with letters L, L, A, B, C, D, E, F, G, H, I, and K iron cores.

Figure 17:
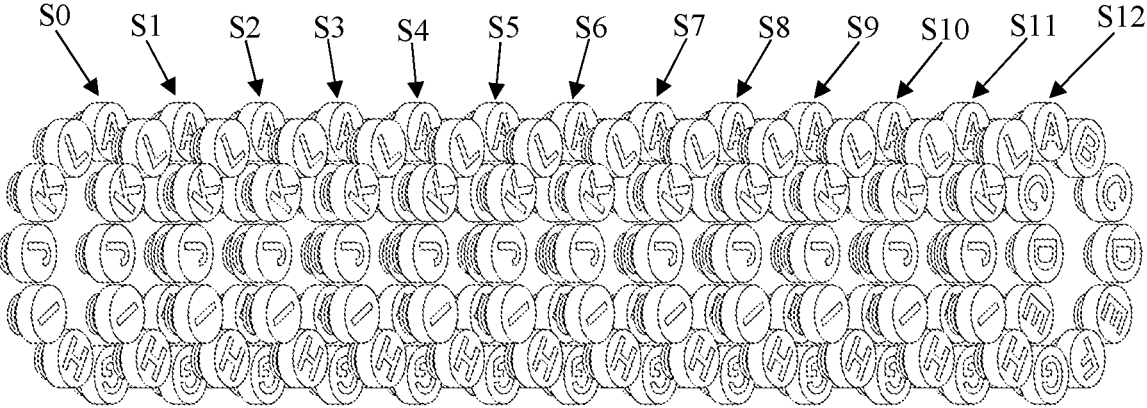

FIG. 17 shows, from a perspective view, thirteen disc-shaped iron core sets S0-S12 formed by the iron core groups. These thirteen disc-shaped iron core sets are identical and parallel to one another, each including 12 iron cores A, B, C, D, E, F, G, H, I, J, K, L in a circle following a same sequence order. Each iron core in an iron core set belongs to different iron core groups. Iron cores of same letters in different iron core sets also belong to different iron core groups, except for the first two iron core sets S0 and S1. Between iron core sets S0 and S1, iron cores of a same letter belong to the same iron core group. For example, the letter A iron cores in the first two iron core sets S1 and S2 all belong to the first iron core group, e.g., shown in FIG. 4.

Figure 18:
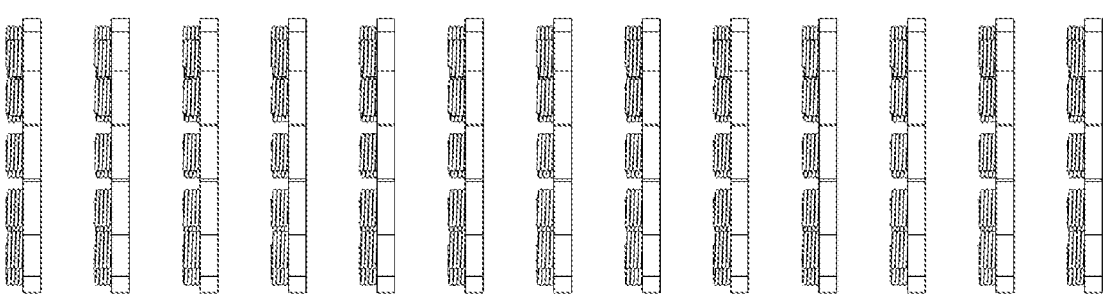

FIG. 18 shows in a side view the thirteen iron core sets in the FIG. 17 description.

Figure 19:
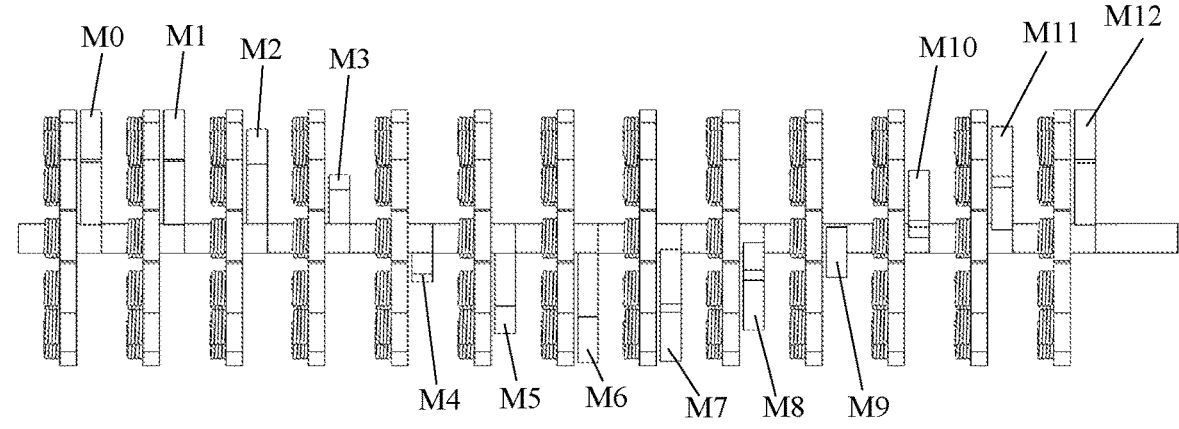

FIG. 19 shows in a side view, the thirteen iron core sets and the first magnet group M0-M12 together with the thirteen disc-shaped iron core sets.

Figure 20:
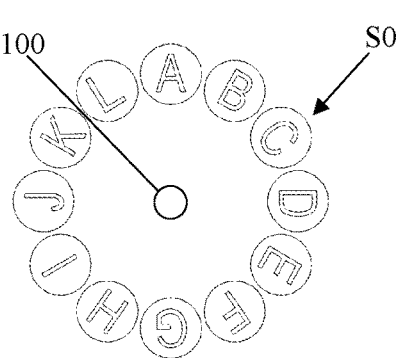

FIG. 20 shows in a front view of the first iron core set S0. The iron cores A, B, C, D, E, F, G, H, I, J, K, and L are arranged around a circle from letter A to letter L, and each iron core in the first iron core set is the first iron core of a respective iron core group.

Figure 21:
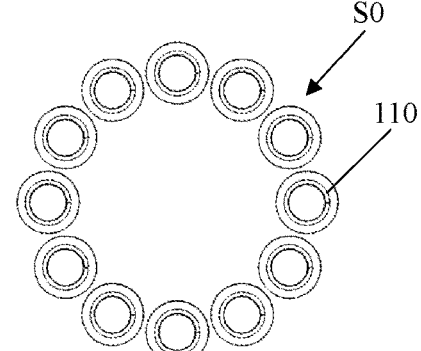

FIG. 21 shows the back view of the first iron core set S0 with coils 110 for all the iron cores.

Figure 22:
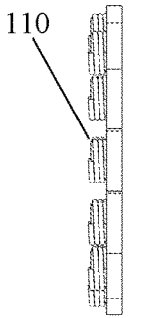

FIG. 22 shows the side view of the first iron core set.

Figure 23:
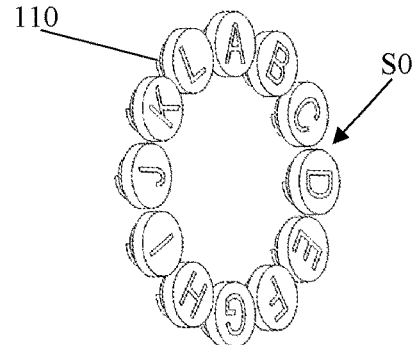

FIG. 23 shows, in a perspective view, the first iron core set S0.

FIG. 24 shows, in a perspective view, back side of the first iron core set S0.

FIG. 25 shows the front view of the first magnet group with 13 magnets helically along the axis 100. In FIG. 25, magnet $M_0$ ("0") and magnet $M_1$ ("1") are covered by the magnet $M_{12}$ "12."

FIG. 26 shows, in a perspective view, the first magnet group with 13 magnets from magnet number zero to magnet number twelve helically along the axis 100.

FIG. 27 shows, in a perspective view, the first magnet group together with the first iron core set S0. As shown in FIG. 27, as an illustrative example, magnet $M_0$ of the first magnet group faces the letter A iron core of the first iron core set S0. The center of the magnet $M_0$ is the same as the letter A iron core at zero degrees on the circle. The rest of the magnets of the first magnet group will at least partially face iron cores from letter A to letter L in the same iron core group, but in different iron core sets. All the magnets of the first magnet group in front of the iron cores are the north magnetic pole. Note that Magnet 12 may not face iron core L if magnets and iron cores are smaller.

In some implementations, all the magnets of the second magnet group in front of the iron cores are the south magnetic pole.

A circle is 360 degrees. In the example that N=13, when a circle is divided into (N−1) or 12 segments, each segment equals 30 degrees. When each of the 12 segments is divided into N or 13 sections, each section will equal approximately 2.3077 degrees. Starting from section 1 to section 13, the figures are as follows: 0.0000, 2.3077, 4.6154, 6.9231, 9.2308, 11.5385, 13.8641, 16.1539, 18.4616, 20.7693, 23.0770, 25.3847, and 27.6924 degrees. The next degrees value following 27.6924 degrees would be 30 degrees which is equivalent to 0.0000 degrees since it repeats and starts again for the next segment.

The value of the 30-degrees segments and 2.3077-degrees sections can be changed with the change in N (N being an odd number) as long as the segment and section figures are set to reach to the balanced points among the magnets and iron cores. Chart 1 (FIG. 115) shows example arrangements of the magnets and iron cores in an example generator, using the illustrative example of 12 magnet groups, each having 13 magnets.

Chart 1 shows that the center of magnet 0 to each magnet up to magnet 12 of the first magnet group will have a different degrees value for each section. When magnet 0 is at 0 degrees, magnet 1 will be 2.3077 degrees. For each following magnet, the degrees value has an additional 2.3077 degrees added to the previous value. When the magnet 0 turns to 2.3077 degrees, magnet 1 will be at 4.6145 degrees and the following magnets will also have an added 2.3077 degrees to their previous value.

Chart 1 further shows information about magnets in the first magnet group changing degrees values on the helical path as it follows the section and segment degrees pattern.

The magnets of the first magnet group are helically installed from magnet 0 to magnet 12. The helical 360-degrees circle is divided into twelve segments and each segment is divided into thirteen sections. Starting from magnet 2, the position of the magnet begins to increase with segment and section values. The value it increases is the sum of the "degrees of iron core segment" plus the "degrees of magnet section".

Chart 1 shows the degrees of the magnets of the first magnet group helically in front of different iron core sets. When the magnet 0 is at 0 degrees, it is in front of the first iron core set. Meanwhile, magnet 1 is 2.3077 degrees and it is in front of the second iron core set. Concurrently, magnet 2 is 34.6154 degrees which is the sum of 30 degrees plus 4.6154 degrees. When the magnet 0 turns to 2.3077 degrees, magnet 1 is 4.6154 degrees and magnet 2 is 36.9231 degrees. This pattern continues from magnet 3 to magnet 12 and is the same for the magnet groups two to twelve.

Figure 28:
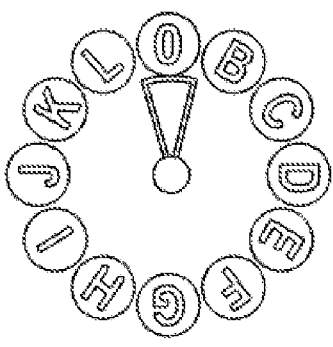
Figure 29:
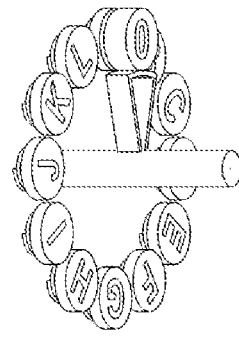

FIGS. 28-53 show as an illustrative example, relative positions of the magnets of the first magnet group with respect to the iron cores of their respective iron core set. FIG. 28 and FIG. 29 show magnet 0 of the first magnet group. The corresponding first iron core set includes 12 iron cores formed in a circle, which are illustratively referenced with letters A through L sequentially. FIG. 28 shows, as an illustrative example, magnet 0 is at 0 degrees. Magnet 0 is in front of the letter A iron core in the first iron core set. The 0 degrees center attractions for magnet 0 and the letter A iron core are balanced.

Figure 30:
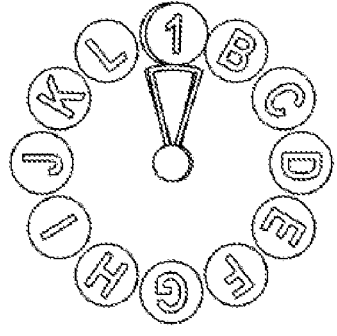
Figure 31:
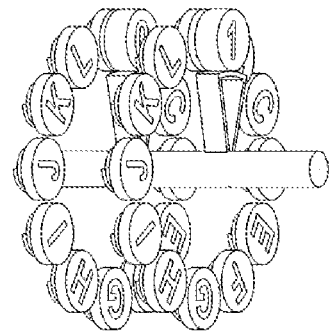

FIG. 30 and FIG. 31 show magnet 1 of the first magnet group. Magnet 1 is in front of the letter A iron core in the respective second iron core set. The center of magnet 1 is 2.3077 degrees clockwise. Magnet 1 has a balanced attraction with magnet 12 in the first magnet group. Magnet 12 is in front of the letter A iron core in the thirteenth iron core set as shown on FIG. 52 and FIG. 53. Magnet 12 is 357.6924 degrees clockwise or 2.3076 degrees counterclockwise. The attraction between magnet 1 and magnet 12 is balanced because their degrees values clockwise and counterclockwise only have a 0.0001-degrees difference which is too small to affect their attraction. That is, the magnet 1 and magnet 12 in the first magnet group have substantially same degrees, although in different directions. The attractions of the magnet 1 and magnet 12 are thus balanced.

Figure 32:
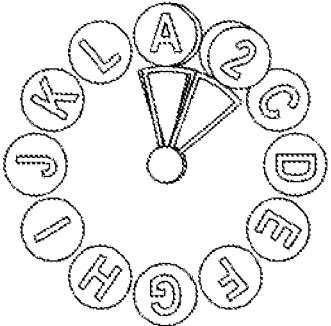
Figure 33:
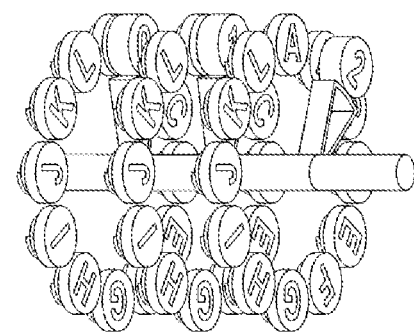
Figure 50:
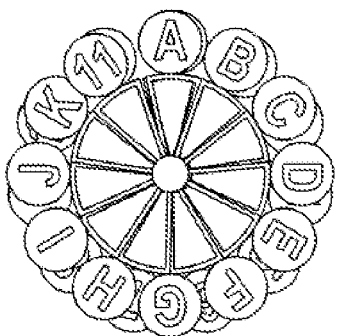
Figure 51:
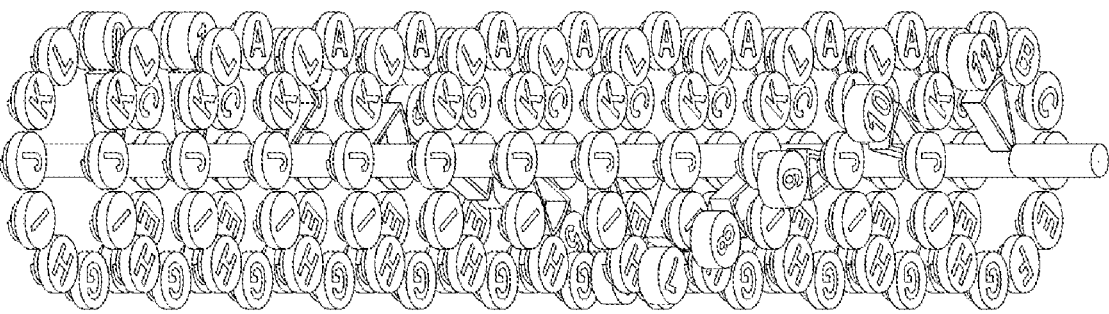

FIG. 32 and FIG. 33 show magnet 2 of the first magnet group. The center of this magnet is 34.6154 degrees clockwise. Magnet 2 is in front of iron core letter B and a small part of iron core letter C in the respective third iron core set. Magnet 2 has a balanced attraction with magnet 11 in the first magnet group. Magnet 11 is in front of iron core letter L and a small part of iron core letter K in the twelfth iron core set as shown in FIG. 50 and FIG. 51. Magnet 11 is 325.3847 degrees clockwise or 34.6153 degrees counterclockwise. The attraction between magnet 2 and magnet 11 balanced because their degrees values clockwise and counterclockwise only have a 0.0001-degrees difference which is too small to affect their attraction.

Figure 34:
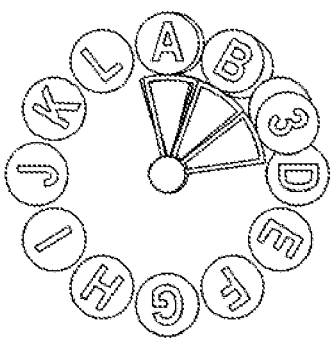
Figure 35:
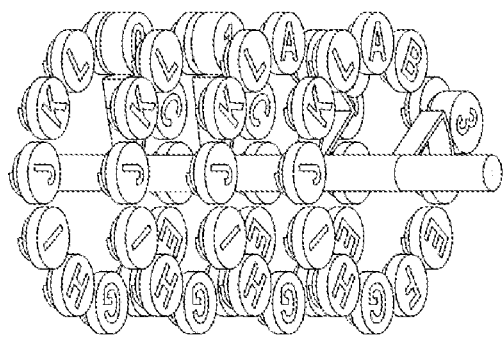
Figure 48:
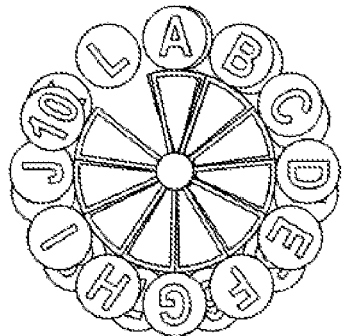
Figure 49:
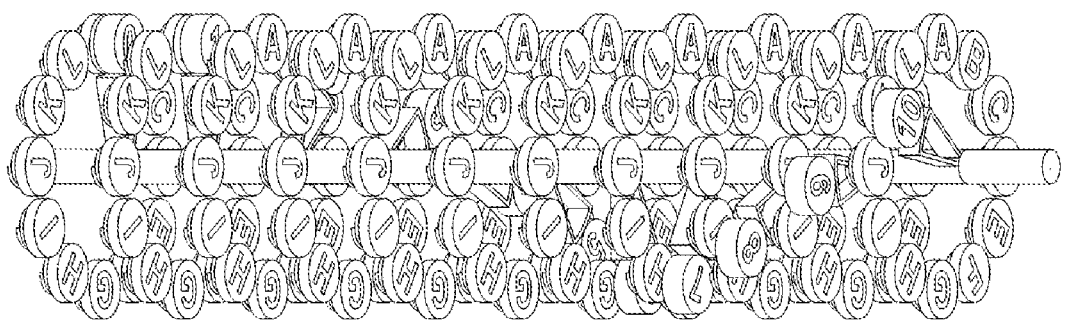

FIG. 34 and FIG. 35 show magnet 3 of the first magnet group. The center of magnet 3 is 66.9231 degrees clockwise. Magnet 3 is in front of iron core letter C and a small part of iron core letter D in the respective fourth iron core set. Magnet 3 has a balanced attraction with magnet 10 in the first magnet group. Magnet 10 is in front of iron core letter K and a small part of iron core letter J in the eleventh iron core set as shown in FIG. 48 and FIG. 49. Magnet 10 is 293.0770 degrees clockwise or 66.9230 degrees counterclockwise. The attraction between magnet 3 and magnet 10 is balanced because their degrees values clockwise and counterclockwise only have a 0.0001-degrees difference which is too small to affect their attraction.

Figure 36:
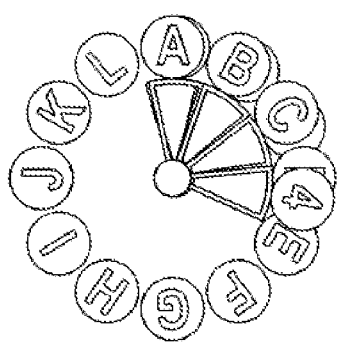
Figure 37:
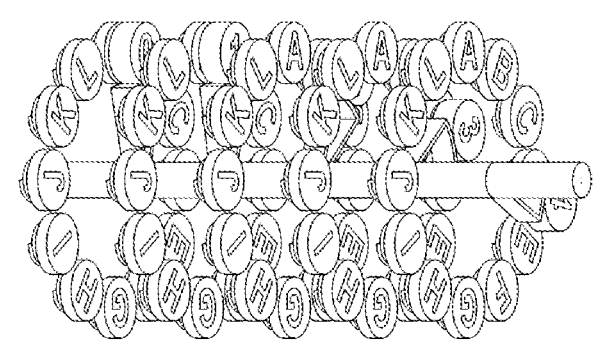
Figure 46:
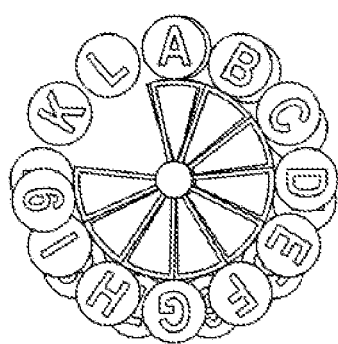
Figure 47:
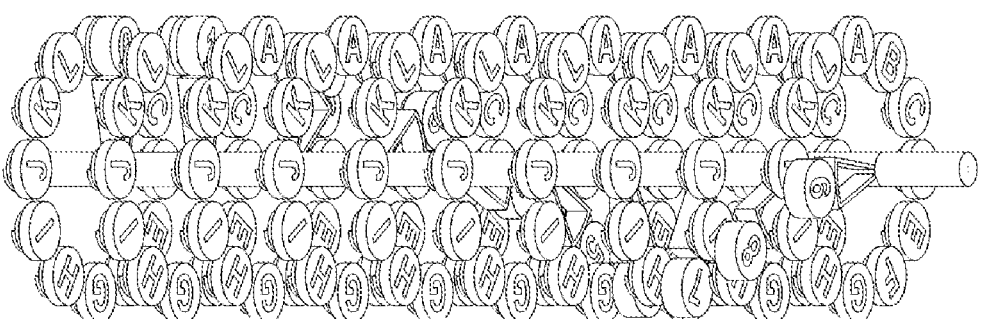

FIG. 36 and FIG. 37 show magnet 4 of the first magnet group. The center of magnet 4 is 99.2308 degrees clockwise. Magnet 4 is in front of iron core letter D and a small part of iron core letter E in the respective fifth iron core set. Magnet 4 has a balanced attraction with magnet 9 in the first magnet group. Magnet 9 is in front of iron core letter J and a small part of iron core letter I in the tenth iron core set as shown in FIG. 46 and FIG. 47. Magnet 9 is 260.7693 degrees clockwise or 99.2307 degrees counterclockwise. The attraction between magnet 4 and magnet 9 is balanced because their degrees values clockwise and counterclockwise only have a 0.0001-degrees difference which is too small to affect their attraction.

Figure 38:
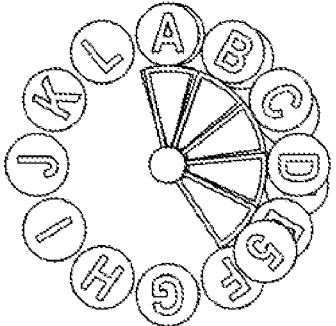
Figure 39:
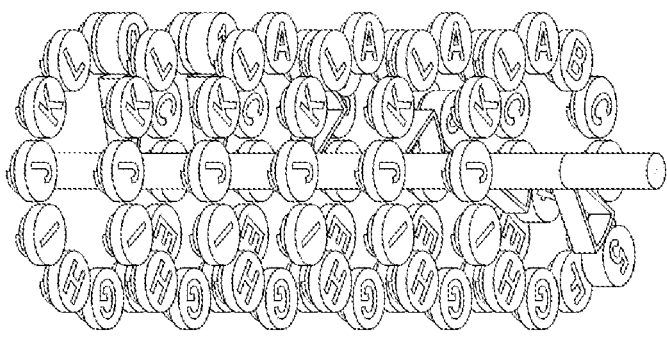
Figure 44:
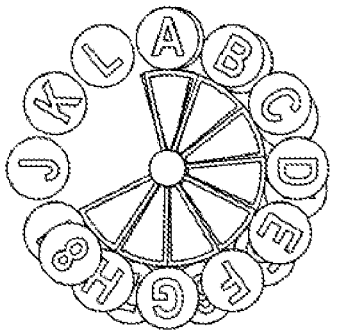
Figure 45:
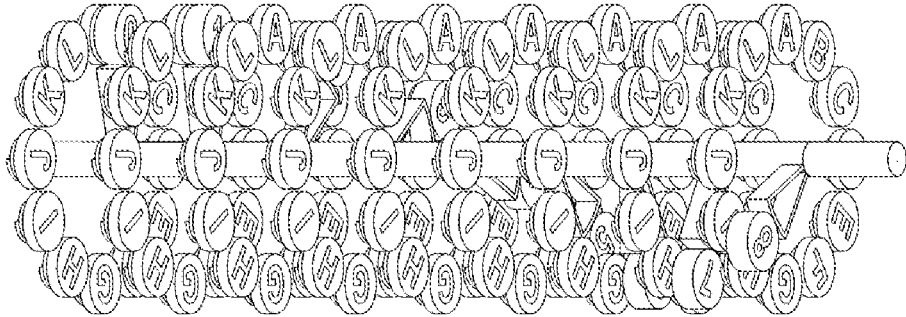

FIG. 38 and FIG. 39 show magnet 5 of the first magnet group. The center of magnet 5 is 131.5385 degrees clockwise. Magnet 5 is in front of iron core letter E and a small part of iron core letter F in the respective sixth iron core set. Magnet 5 has a balanced attraction with magnet 8 in the first magnet group. Magnet 8 is in front of iron core letter I and a small part of iron core letter H in the ninth iron core set as shown in FIG. 44 and FIG. 45. Magnet 8 is 228.4616 degrees clockwise or 131.5384 degrees counterclockwise. The attraction between magnet 5 and magnet 8 is balanced because their degrees values clockwise and counterclockwise only have a 0.0001-degrees difference which is too small to affect their attraction.

Figure 40:
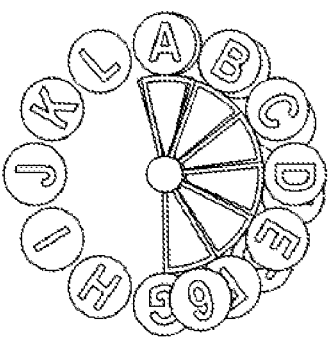
Figure 41:
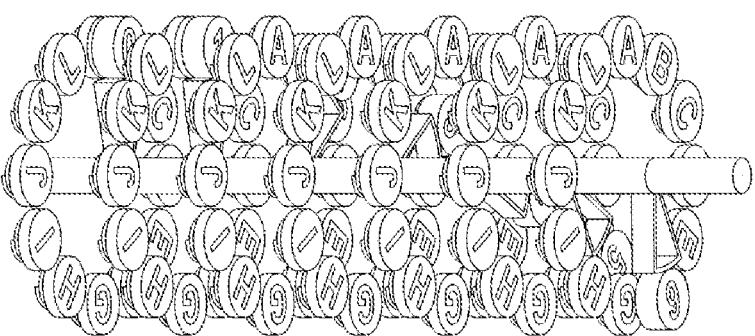
Figure 42:
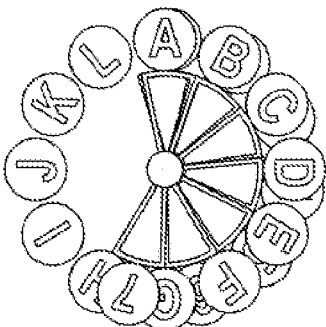
Figure 43:
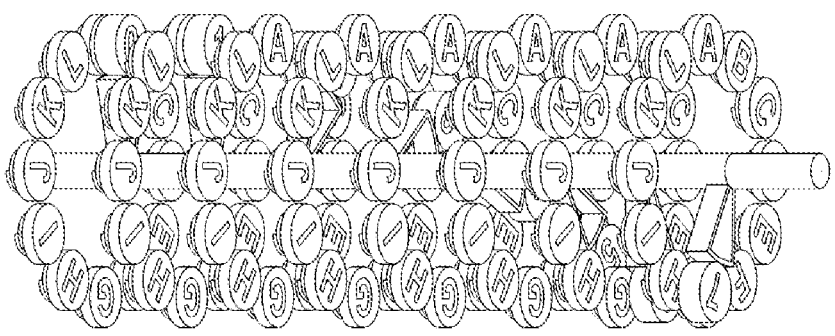

FIG. 40 and FIG. 41 show magnet 6 of the first magnet group. The center of magnet 6 is 163.8462 degrees clockwise. Magnet 6 is in front of iron core letters F and G in the respective seventh iron core set. Magnet 6 has a balanced attraction with magnet 7 in the first magnet group. Magnet 7 is in front of iron core letters G and H in the eighth iron core set as shown in FIG. 42 and FIG. 43. Magnet 7 is 196.1539 degrees clockwise or 163.8461 degrees counterclockwise. The attraction between magnet 6 and magnet 7 is balanced because their degrees values clockwise and counterclockwise only have a 0.0001-degrees difference which is too small to affect their attraction.

FIG. 42 and FIG. 43 show magnet 7 of the first magnet group. The center of magnet 7 is 196.1539 degrees clockwise. Magnet 7 is in front of iron core letters G and H in the respective eighth iron core set. Magnet 7 has a balanced attraction with magnet 6 in the first magnet group. Magnet 6 is in front of iron core letters F and G in the seventh iron core set as shown in FIG. 40 and FIG. 41. Magnet 6 is 163.8462 degrees clockwise or 196.1538 degrees counterclockwise. The attraction between magnet 7 and magnet 6 is balanced because their degrees values clockwise and counterclockwise only have a 0.0001-degrees difference which is too small to affect their attraction.

FIG. 44 and FIG. 45 show magnet 8 of the first magnet group. The center of magnet 8 is 228.4616 degrees clockwise. Magnet 8 is in front of iron core letter I and a small part of iron core letter H in the respective ninth iron core set. Magnet 8 has a balanced attraction with magnet 5 in the first group. Magnet 5 is in front of iron core letter E and a small part of iron core letter F in the sixth iron core set as shown in FIG. 38 and FIG. 39. Magnet 5 is 131.5385 degrees clockwise or 228.4615 degrees counterclockwise. The attraction between magnet 8 and magnet 5 is balanced because their degrees values clockwise and counterclockwise, respectively, only have a 0.0001-degrees difference which is too small to affect their attraction.

FIG. 46 and FIG. 47 show magnet 9 of the first magnet group. The center of magnet 9 is 260.7693 degrees clockwise. Magnet 9 is in front of iron core letter J and a small part of iron core letter I in the tenth iron core set. Magnet 9 has a balanced attraction with magnet 4 in the first magnet group. Magnet 4 is in front of iron core letter D and a small part of iron core letter E in the fifth iron core set as shown in FIG. 36 and FIG. 37. Magnet 4 is 99.2308 degrees clockwise or 260.7692 degrees counterclockwise. The attraction between magnet 9 and magnet 4 is balanced because their degrees values clockwise and counterclockwise only have a 0.0001-degrees difference which is too small to affect their attraction.

FIG. 48 and FIG. 49 show magnet 10 of the first magnet group. The center of magnet 10 is 293.0770 degrees clockwise. Magnet 10 is in front of iron core letter K and a small part of iron core letter J in the respective eleventh iron core set. Magnet 10 has a balanced attraction with magnet 3 in the first magnet group. Magnet 3 is in front of iron core letter C and a small part of iron core letter D in the fourth iron core set as shown in FIG. 34 and FIG. 35. Magnet 3 is 66.9231 degrees clockwise or 293.0769 degrees counterclockwise. The attraction between magnet 10 and magnet 3 is balanced because their degrees values clockwise and counterclockwise, respectively, only have a 0.0001-degrees difference which is too small to affect their attraction.

FIG. 50 and FIG. 51 show magnet 11 of the first magnet group. The center of magnet 11 is 325.3847 degrees clockwise. Magnet 11 is in front of iron core letter L and a small part of iron core letter K in the respective twelfth iron core set. Magnet 11 has a balanced attraction with magnet 2 in the first magnet group. Magnet 2 is in front of iron core letter B and a small part of iron core letter C in the third iron core set as shown on FIG. 32 and FIG. 33. The magnet 2 is 34.6154 degrees clockwise or 325.3846 degrees counterclockwise. The attraction between magnet 11 and magnet 2 is balanced because their degrees values clockwise and counterclockwise only have a 0.0001-degrees difference which is too small to affect their attraction.

Figure 52:
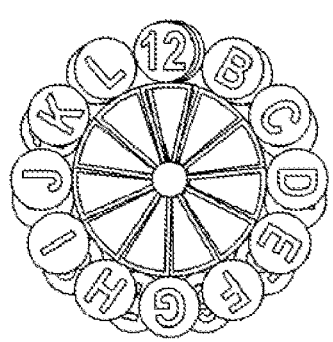
Figure 53:
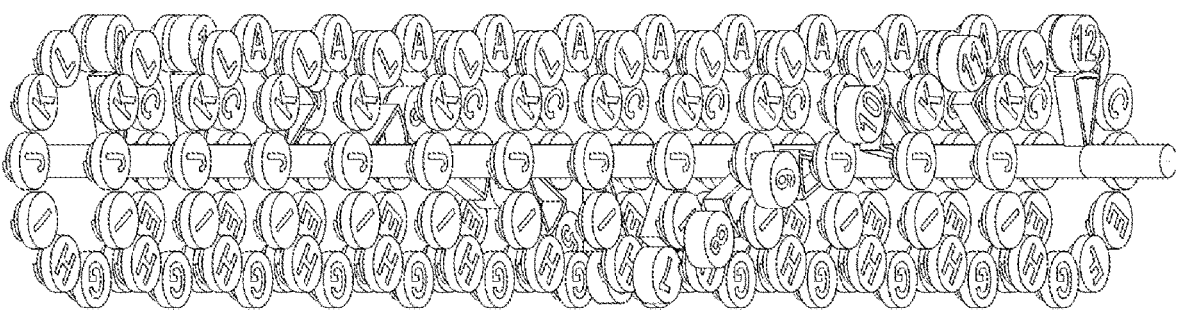

FIG. 52 and FIG. 53 show magnet 12 of the first magnet group. The center of magnet 12 is 357.6924 degrees clockwise. Magnet 12 is in front of iron core letter A in the respective thirteenth iron core set. Magnet 12 has a balanced attraction with magnet 1 in the first magnet group. Magnet 1 is in front of iron core letter A in the second iron core set as shown in FIG. 30 and FIG. 31. Magnet 1 is 2.3077 degrees clockwise or 357.6923 degrees counterclockwise. The attraction between magnet 12 and magnet 1 is balanced because their degrees values clockwise and counterclockwise only have a 0.0001-degrees difference which is too small to affect their attraction.

The generators of the disclosure include magnets and iron cores positioned to achieve balanced points among the magnets and iron cores. As such the attractions are balanced which results in little to no resistance when the axis rotates to produce energy. Chart 1 (FIG. 115) shows the degrees and values for the magnets 0 to magnet 12, and iron cores A to iron core L, which are in a 30-degrees segment. This angle reflects that angle between a magnet in a group of magnets with respect to the corresponding iron cores in the corresponding iron core group. Again, when the magnet $M_0$ is zero degrees, i.e., aligned with the iron core $C_0$ of the corresponding iron core group, magnet $M_1$ is 2.3077 degrees offset from the iron core $C_1$ of the corresponding iron core group, magnet $M_2$ is 4.6154 degrees offset from the iron core $C_2$ of the corresponding iron core group, magnet $M_3$ is 6.9231 degrees offset from the iron core $C_3$ of the corresponding iron core group, magnet $M_4$ is 9.2308 degrees offset from the iron core $C_4$ of the corresponding iron core group, magnet $M_5$ is 11.5385 degrees offset from the iron core $C_5$ of the corresponding iron core group, magnet $M_6$ is 13.8462 degrees offset from the iron core $C_6$ of the corresponding iron core group, magnet $M_7$ is 16.1539 degrees offset from the iron core $C_7$ of the corresponding iron core group, magnet $M_8$ is 18.4616 degrees offset from the iron core $C_8$ of the corresponding iron core group, magnet $M_9$ is 20.7693 degrees offset from the iron core $C_9$ of the corresponding iron core group, magnet $M_{10}$ is 23.0770 degrees offset from the iron core $C_{10}$ of the corresponding iron core group, magnet $M_{11}$ is 25.3847 degrees offset from the iron core $C_{11}$ of the corresponding iron core group, and magnet $M_{12}$ is 27.6924 degrees offset from the iron core $C_{12}$ of the corresponding iron core group.

This data shows that the degrees value range of 0 to 30 degrees in a segment repeats throughout the axis rotation in this design. In other words, when magnet $M_0$ "0" of the first magnet group reaches 30 degrees during rotation, it has reset to 0 degrees in the next segment.

Chart 1 shows that when magnet $M_0$ of the first magnet group is 0 degrees, its center is balanced with the center of the letter A iron core. The attraction of magnet $M_1$ "1" is balanced by that of magnet $M_{12}$ "12" because magnet $M_1$ is 2.3077 degrees and magnet $M_{12}$ is 27.6924 degrees which adds to 30 degrees of a segment. Likewise, magnet $M_2$ "2" is balanced by magnet $M_{11}$ "11", magnet $M_3$ "3" is balanced by magnet $M_{10}$ "10", magnet $M_4$ "4" is balanced by magnet $M_9$ "9", magnet $M_5$ "5" is balanced by magnet $M_8$ "8", and magnet $M_6$ "6" is balanced by magnet $M_7$ "7".

Chart 1 shows that the magnets of the first magnet group are helically installed along the same axis. Magnets of the first magnet group will be in front of iron cores from the first to thirteenth iron core set, respectively. In this installment, magnet 0 and magnet 1 only have an angular difference of the value of one section. However, starting from magnet 2, the difference equals the value of its section plus the degrees of the iron core segment.

Furthermore, when magnet 0 of the first magnet group turns to 2.3077 degrees, the attraction of magnet 0 is balanced by magnet 11, magnet 1 is balanced by magnet 10, magnet 2 is balanced by magnet 9, magnet 3 is balanced by magnet 8, magnet 4 is balanced by magnet 7, magnet 5 is balanced by magnet 6, and the magnet 12 attraction is balanced by its center matching the center of an iron core.

As shown in Chart 1, when magnet 0 of the first magnet group turns to 4.6154 degrees, the magnet 0 attraction is balanced by magnet 9, magnet 1 is balanced by magnet 8, magnet 2 is balanced by magnet 7, magnet 3 is balanced by magnet 6, magnet 4 is balanced by magnet 5, magnet 10 is balanced by magnet 12, and magnet 11 is balanced by its center matching the center of an iron core.

As shown in Chart 1, when magnet 0 of the first magnet group turns to 6.9231 degrees, the magnet 0 attraction is balanced by magnet 7, magnet 1 is balanced by magnet 6, magnet 2 is balanced by magnet 5, magnet 3 is balanced by magnet 4, magnet 8 is balanced by magnet 12, magnet 9 is balanced by magnet 11, and magnet 10 is balanced by its center matching the center of an iron core.

As shown in Chart 1, when magnet 0 of the first magnet group turns to 9.2308 degrees, the magnet 0 attraction is balanced by magnet 5, magnet 1 is balanced by magnet 4, magnet 2 is balanced by magnet 3, magnet 6 is balanced by magnet 12, magnet 7 is balanced by magnet 11, magnet 8 is balanced by magnet 10, and magnet 9 is balanced by its center matching the center of an iron core.

As shown in Chart 1, when magnet 0 of the first magnet group turns to 11.5385 degrees, the magnet 0 attraction is balanced by magnet 3, magnet 1 is balanced by magnet 2, magnet 4 is balanced by magnet 12, magnet 5 is balanced by magnet 11, magnet 6 is balanced by magnet 10, magnet 7 is balanced by magnet 9, the magnet 8 is by its center matching the center of an iron core.

As shown in Chart 1, when magnet 0 of the first magnet group turns to 13.8462 degrees, the magnet 0 attraction is balanced by magnet 1, magnet 2 is balanced by magnet 12, magnet 3 is balanced by magnet 11, magnet 4 is balanced by magnet 10, magnet 5 is balanced by magnet 9, magnet 6 is balanced by magnet 8, and magnet 7 is balanced by its center matching the center of an iron core.

As shown in Chart 1, when magnet 0 of the first magnet group turns to 16.1539 degrees, the magnet 0 attraction is balanced by magnet 12, magnet 1 is balanced by magnet 11, magnet 2 is balanced by magnet 10, magnet 3 is balanced by magnet 9, magnet 4 is balanced by magnet 8, magnet 5 is balanced by magnet 7, and magnet 6 is balanced by its center matching the center of an iron core.

As shown in Chart 1, when magnet 0 of the first magnet group turns to 18.4616 degrees, the magnet 0 attraction is balanced by magnet 10, magnet 1 is balanced by magnet 9, magnet 2 is balanced by magnet 8, magnet 3 is balanced by magnet 7, magnet 4 is balanced by magnet 6, magnet 11 is balanced by magnet 12, and magnet 5 is balanced by its center matching the center of an iron core.

As shown in Chart 1, when magnet 0 of the first magnet group turns to 20.7693 degrees, the magnet 0 attraction is balanced by magnet 8, magnet 1 is balanced by magnet 7, magnet 2 is balanced by magnet 6, magnet 3 is balanced by magnet 5, magnet 9 is balanced by magnet 12, magnet 10 is balanced by magnet 11, and magnet 4 is balanced by its center matching the center of an iron core.

As shown in Chart 1, when magnet 0 of the first magnet group turns to 23.0770, the magnet 0 attraction is balanced by magnet 6, magnet 1 is balanced by magnet 5, magnet 2 is balanced by magnet 4, magnet 7 is balanced by magnet 12, magnet 8 is balanced by magnet 11, magnet 9 is balanced by magnet 10, the magnet 3 is balanced by its center matching the center of an iron core.

As shown in Chart 1, when magnet 0 of the first magnet group turns to 25.3847 degrees, the magnet 0 attraction is balanced by magnet 4, magnet 1 is balanced by magnet 3, magnet 5 is balanced by magnet 12, magnet 6 is balanced by magnet 11, magnet 7 is balanced by magnet 10, magnet 8 is balanced by magnet 9, and magnet 2 is balanced by its center matching the center of an iron core.

As shown in Chart 1, when magnet 0 of the first magnet group turns to 27.6924 degrees, the magnet 0 attraction is balanced by magnet 2, magnet 3 is balanced by magnet 12, magnet 4 is balanced by magnet 11, magnet 5 is balanced by magnet 10, magnet 6 is balanced by magnet 9, magnet 7 is balanced by magnet 8, and magnet 1 is balanced by its center matching the center of an iron core.

When the center of magnet 0 of the first magnet group rotates from 0 degrees to 2.3077, 4.6154, 6.9231, 9.2308, 11.5385, 13.8462, 16.1539, 18.4616, 20.7693, 23.0770, 25.3847, 27.6924 and 30 degrees, the first magnet group has rotated through the first segment and is now beginning the same process in the next segment. Therefore, the second magnet group installed at 30 degrees in the circle will complete the same process as the first magnet group, just starting at 30 degrees instead of 0 degrees. Likewise, the third magnet group to twelfth magnet groups installed on the same axis have the same exact processes of the first magnet group running from 60 to 330 degrees. All twelve magnet groups have the same exact conditions as the first magnet group in regard to its processes and magnet attraction with the iron cores.

Moreover, the right side of each magnet is the same as the left side with an iron core set, however, it is flipped so that both sides are balanced.

In sum, the balanced attractions controlling all the magnets and iron cores serve the purpose to achieve a smooth rotation. When the axis is turned, the changing magnetic field and magnetic flux through the coils are not influenced by the balanced attractions among magnets and iron cores. As the result, all the mechanisms mentioned above for this generator invent a generator with minimal to non-existent resistance when rotating the axis of the generator to produce electricity.

Figure 54:
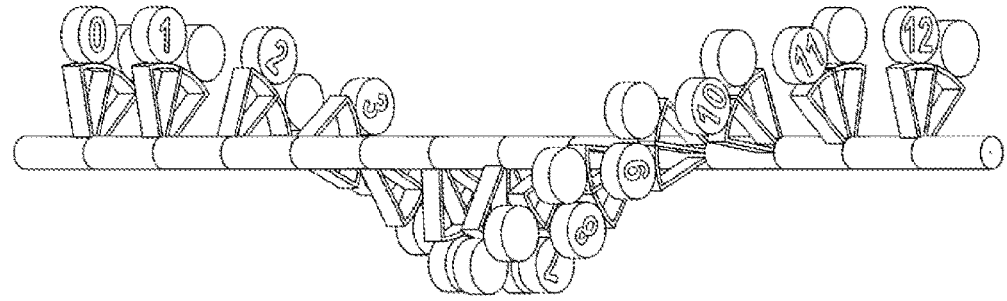

FIG. 54 shows, in a perspective view, the second magnet group helically following the first magnet group on the same axis 100. All the magnets of the second magnet group in front of the iron cores are the south magnetic pole.

Figure 55:
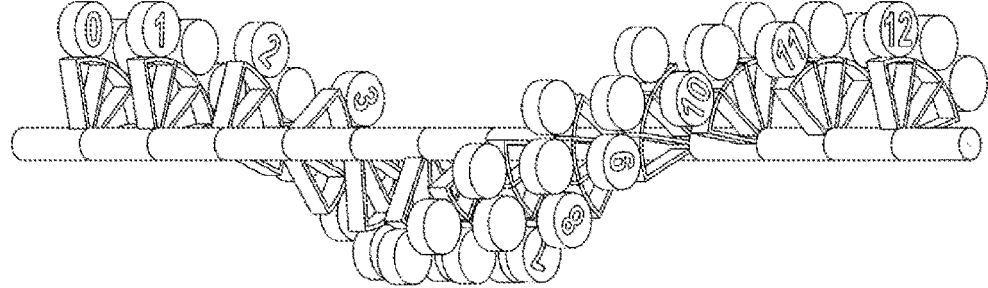

FIG. 55 shows, in a perspective view, the third magnet group helically following the second magnet group on the same axis 100. All the magnets of the third magnet group in front of the iron cores are north magnetic pole.

Figure 56:
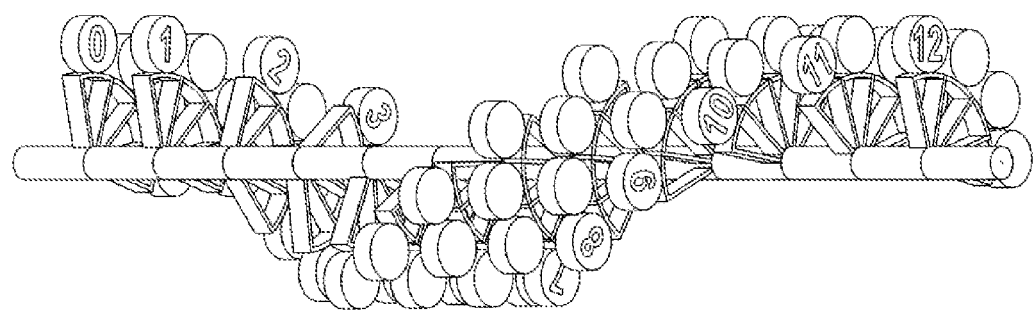

FIG. 56 shows, in a perspective view, the fourth magnet group helically following the third magnet group on the same axis 100. All the magnets of the fourth magnet group in front of the iron cores are south magnetic pole.

Figure 57:
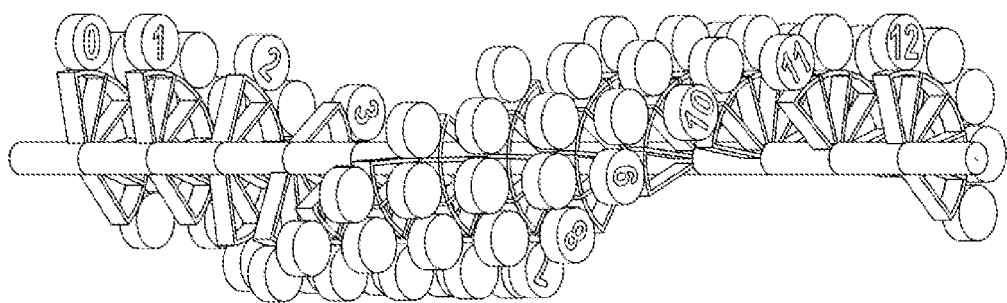

FIG. 57 shows, in a perspective view, the fifth magnet group helically following the fourth magnet group on the same axis 100. All the magnets of the fifth magnet group in front of the iron cores are north magnetic pole.

Figure 58:
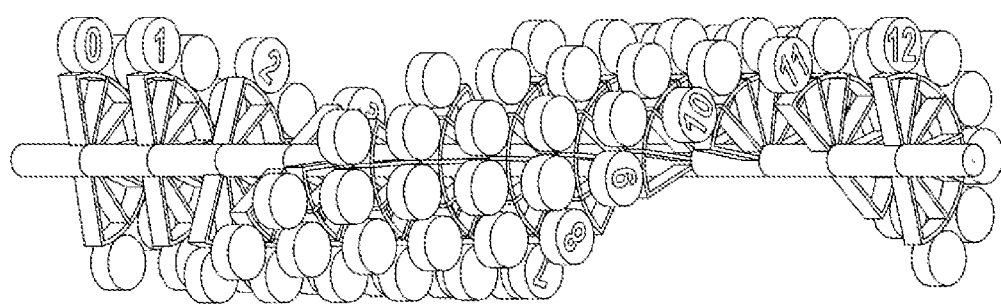

FIG. 58 shows, in a perspective view, the sixth magnet group helically following the fifth magnet group on the same axis 100. All the magnets of the sixth magnet group in front of the iron cores are south magnetic pole.

Figure 59:
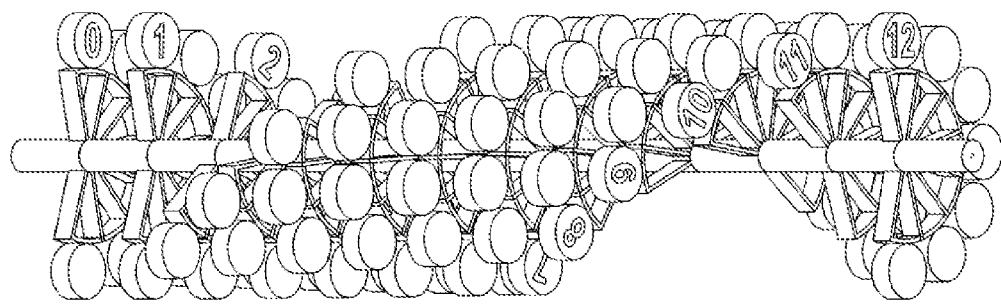

FIG. 59 shows, in a perspective view, the seventh magnet group helically following the sixth magnet group on the same axis 100. All the magnets of the seventh magnet in front of the iron cores are north magnetic pole.

Figure 60:
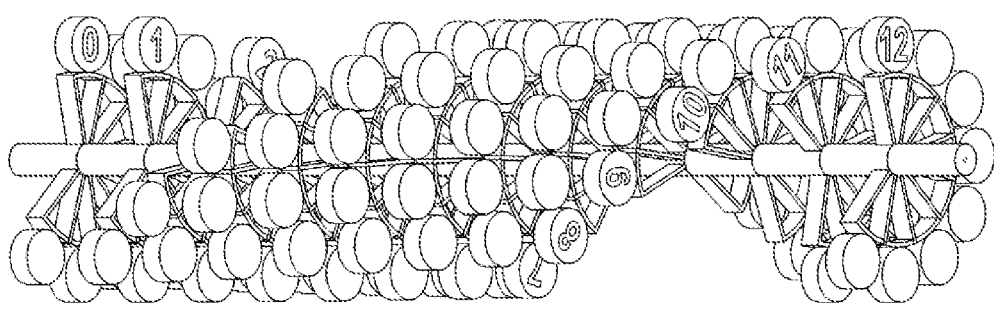

FIG. 60 shows, in a perspective view, the eighth magnet group helically following the seventh magnet group on the same axis 100. All the magnets of the eighth magnet group in front of the iron cores are south magnetic pole.

Figure 61:
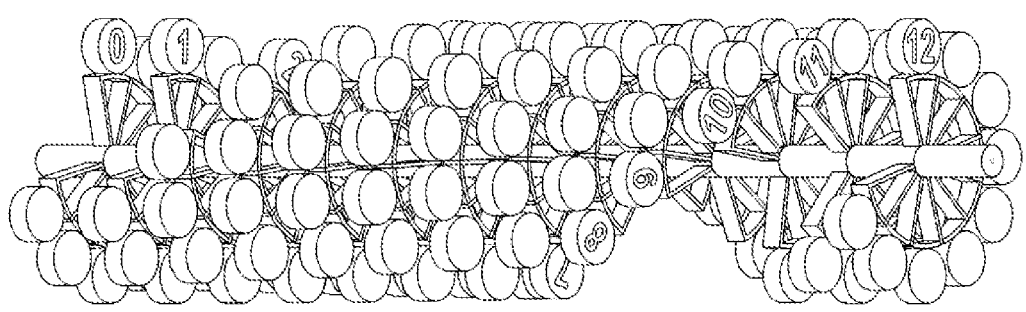

FIG. 61 shows, in a perspective view, the ninth magnet group helically following the eighth magnet group on the same axis 100. All the magnets of the ninth magnet group in front of the iron cores are north magnetic pole.

Figure 62:
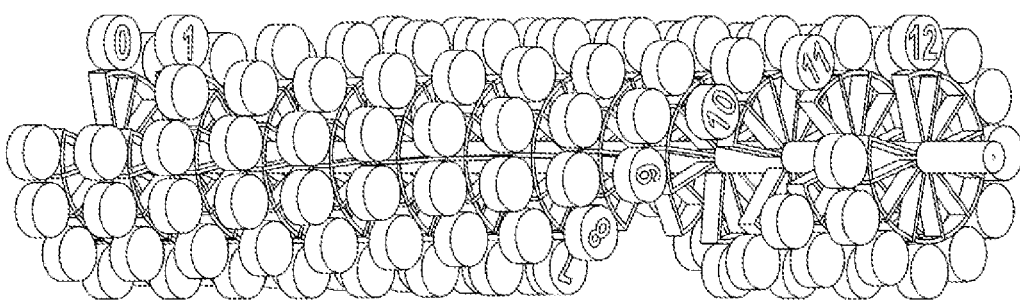

FIG. 62 shows, in a perspective view, the tenth magnet group helically following the ninth magnet group on the same axis 100. All the magnets of the tenth magnet group in front of the iron cores are south magnetic pole.

Figure 63:
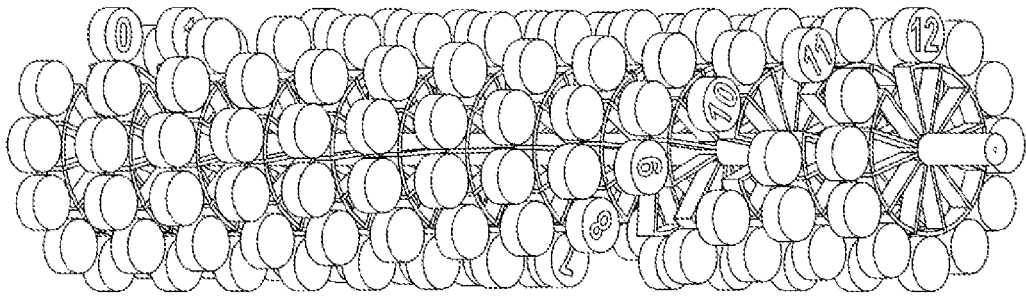

FIG. 63 shows, in a perspective view, the eleventh magnet group helically following the tenth magnet group on the same axis 100. All the magnets of the eleventh magnet group in front of the iron cores are north magnetic pole.

Figure 64:
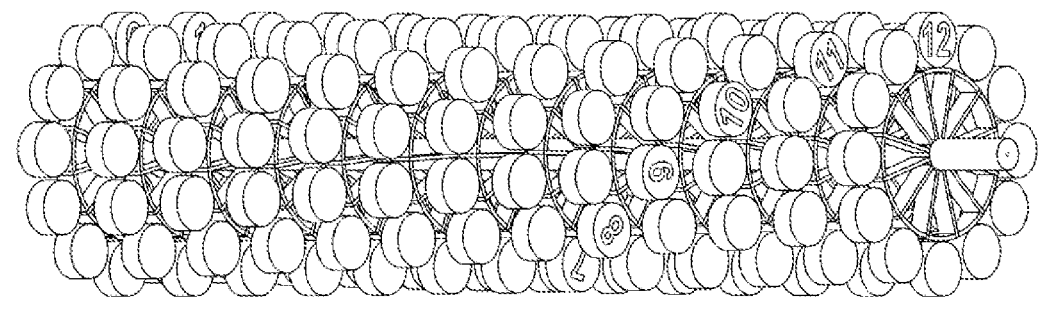

FIG. 64 shows, in a perspective view, the twelfth magnet group helically following the eleventh magnet group on the same axis 100. All the magnets of the twelfth magnet group in front of the iron cores are south magnetic pole.

Figure 65:
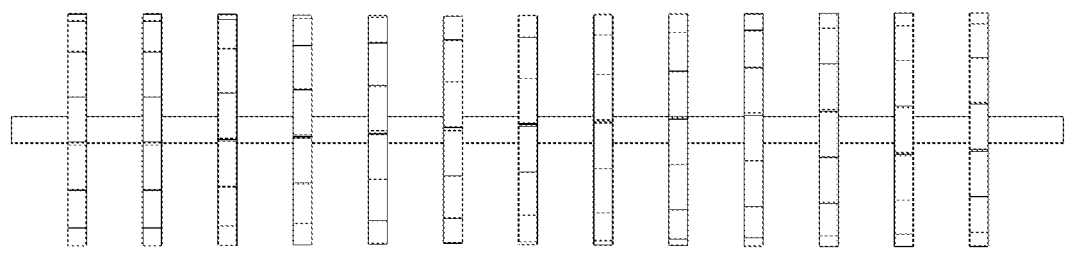

FIG. 65 shows the side view of twelve magnet groups helically on the same axis. Each magnet group has 13 magnets labeled 0 through 12. These twelve magnet groups put together form a cylinder shape comprised of thirteen magnet segments. Each magnet segments include 12 magnets, one from each of the twelve magnet groups, forming a circle.

Figure 66:
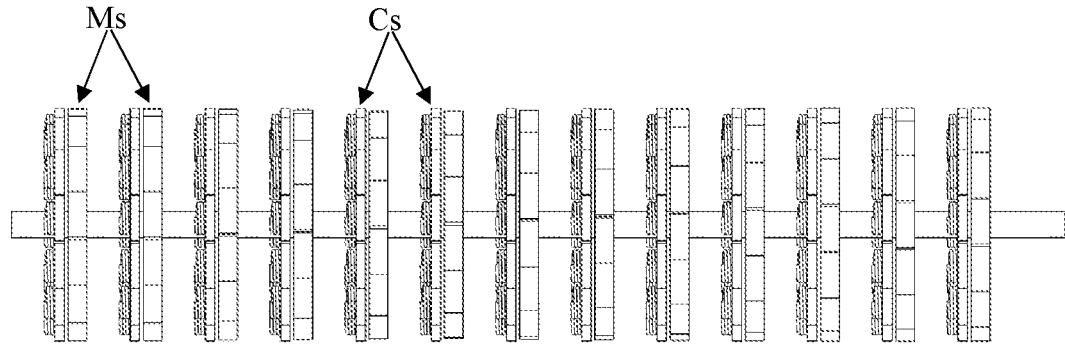

FIG. 66 shows the side view of twelve magnet groups forming thirteen magnet segments Ms, with thirteen iron core sets Cs on the left side.

Figure 67:
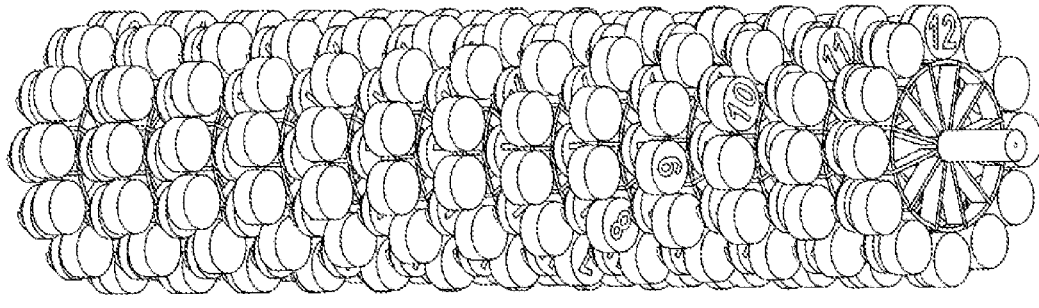

FIG. 67 shows, in a perspective view, the twelve magnet groups together with thirteen iron core sets on the left side.

Figure 68:
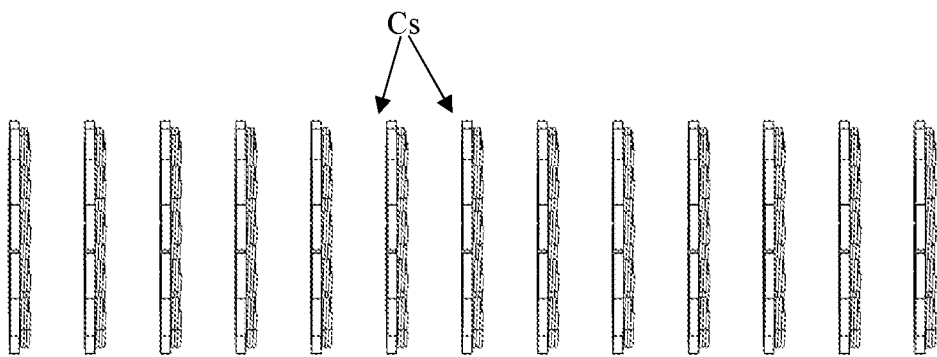

FIG. 68 shows an additional thirteen identical iron core sets Cs flipped on the right side of the twelve magnet groups.

Figure 69:
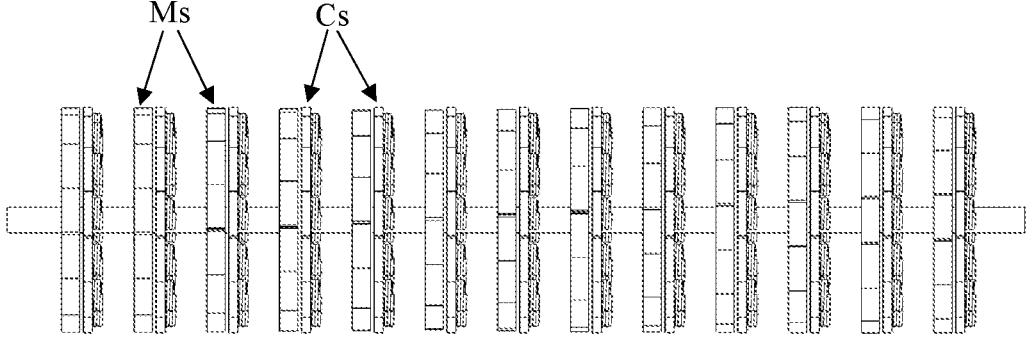

FIG. 69 shows the additional thirteen identical iron core sets arranged on the right side of the magnet groups forming thirteen magnet segments Ms.

Figure 70:
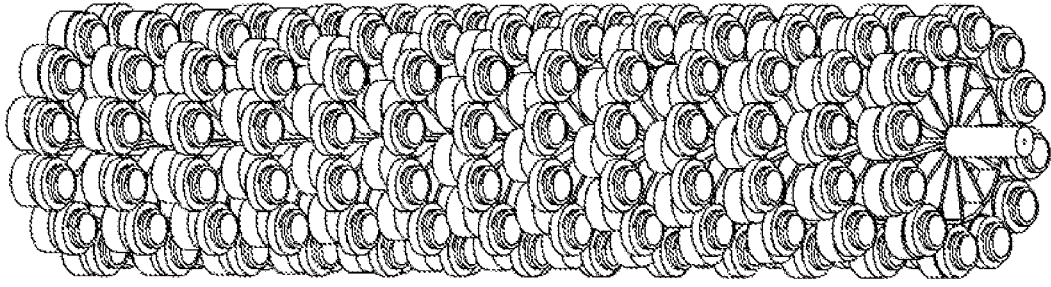

FIG. 70 shows, in a perspective view, the additional thirteen identical iron core sets arranged on the right side of the magnet groups.

FIG. 71 shows the side view of the twelve magnet groups forming thirteen magnet segments Ms with iron core sets Cs arranged on both the left and right sides.

FIG. 72 shows, in a perspective view, the thirteen magnet groups with iron core sets arranged on both sides of the magnets.

FIG. 73 and FIG. 74 show that this generator can also add square-shaped magnets Ma and square-shaped iron cores Ca around the circumference of the magnet segment Ms. In some implementations, the additional square-shaped magnets Ma each includes an opposite magnetic pole from those of the adjacent magnet in the magnet segments Ms.

Figure 75:
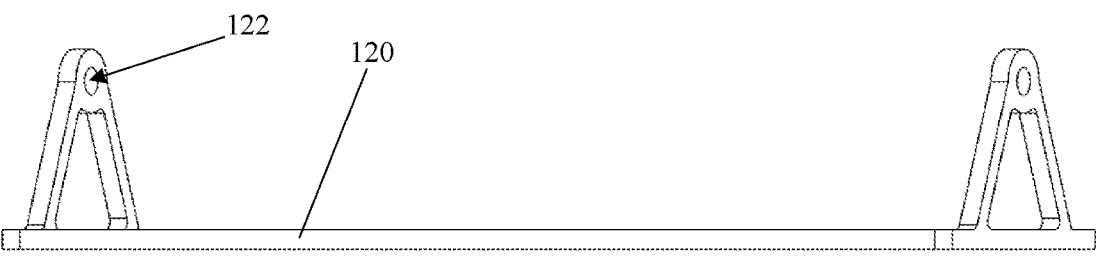
FIG. 75 shows the frame that can the axis of the magnet groups with the axis in the center.

FIG. 75 shows a magnet frame 120 that will hold the axis 100 of the magnet groups with the axis 100 configured to be arranged in the center hole 122 of the magnet frame 120.

Figure 76:
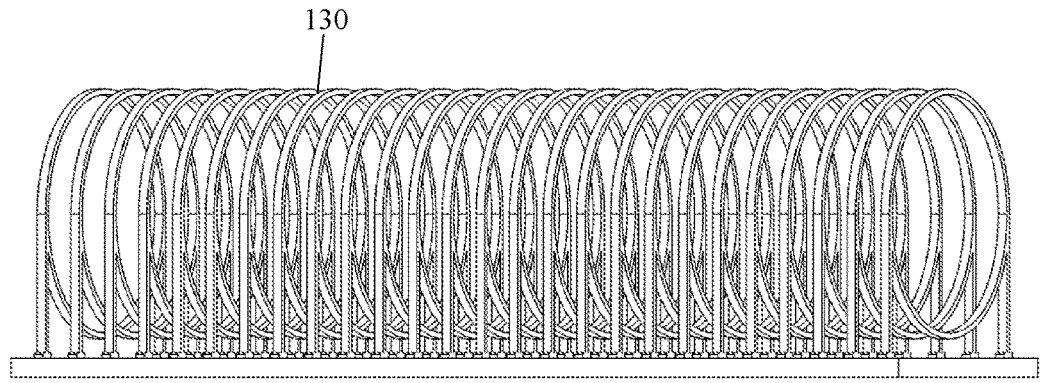
FIG. 76 shows the frame that can hold the iron cores.

FIG. 76 shows a core frame 130 that will hold the iron cores.

Figure 77:
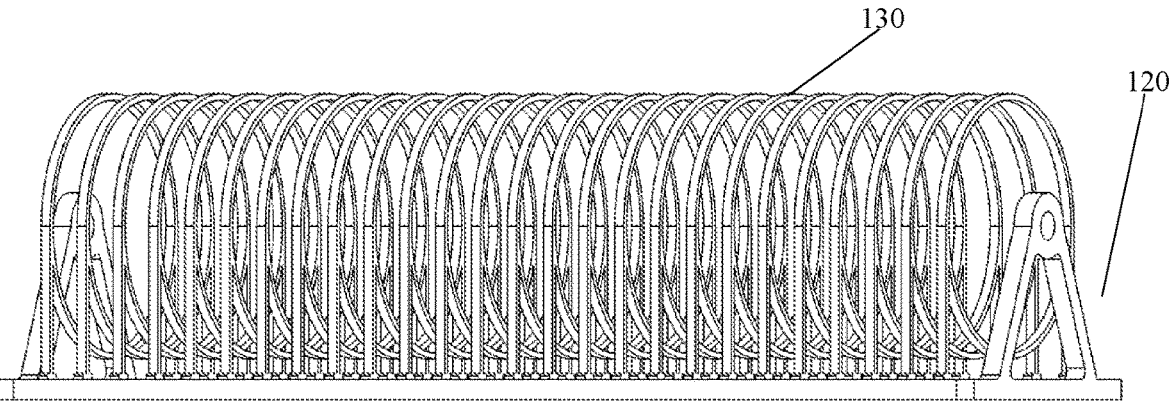
FIG. 77 shows the magnet frame and iron core frame assembled.

FIG. 77 shows the magnet frame 120 and iron core frame assembled.

Figure 78:
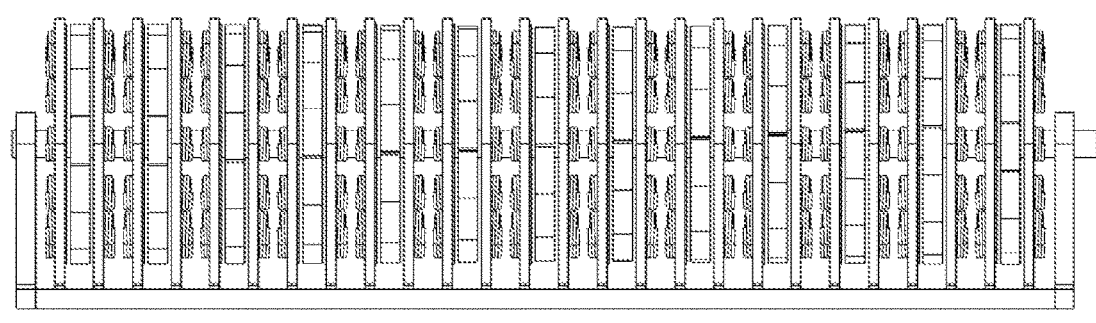
FIGS. 78 and 79 show in various views all the magnet groups, iron core sets, and assembled frames put together.

FIG. 78 shows all the magnet groups, iron core sets, and assembled frames together.

Figure 79:
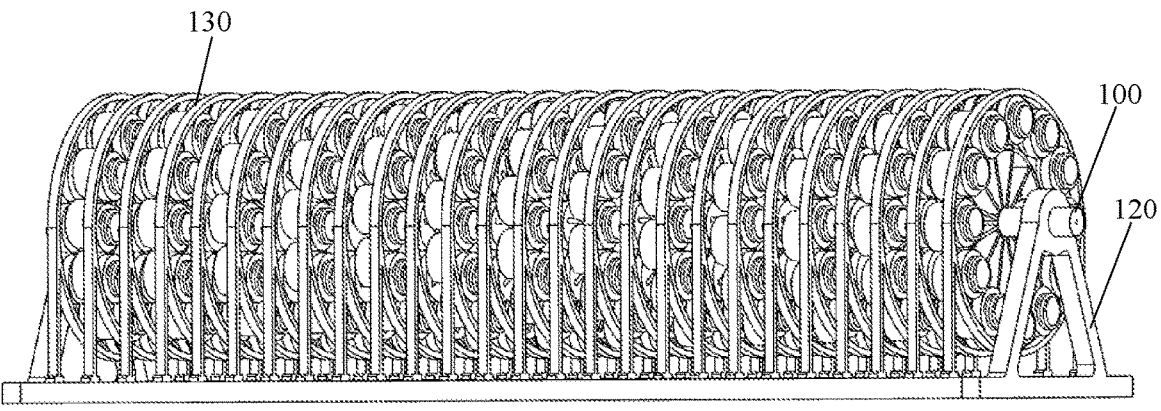

FIG. 79 shows, in a perspective view, all the magnet groups, iron core sets, and assembled frames 120, 130 together.

Figure 80:
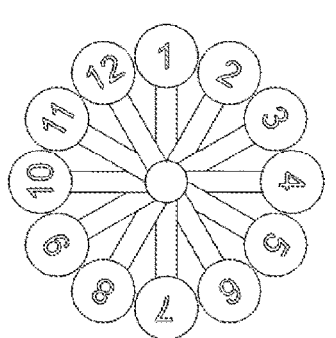
FIGS. 80-82 show in various views a group of 12 magnets helically arranged along an axis.
Figure 81:
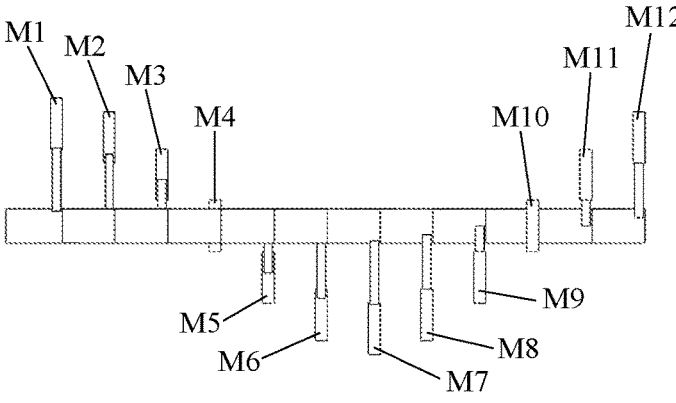
Figure 82:
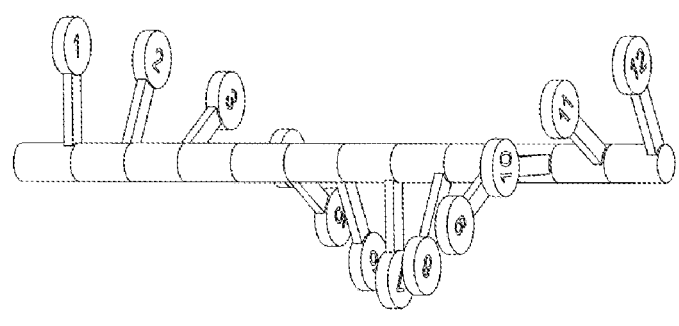

In another implementation, a generator includes an even number N of groups of magnets. Each of the N groups includes an even number N of magnets, e.g., 12 magnets as shown in FIGS. 80-82, helically arranged along an axis of a generator.

There are N sets of iron cores positioned along the axis of the generator, each set of iron cores corresponding or adjacent to a magnet of the magnet group, and arranged in a plane substantially orthogonal to the axis.

The N magnets in each magnet group are arranged with angles determined based on the following equation:

$$\theta_n = \theta_1 + \left[(n-1) * \frac{360}{N}\right], \tag{4}$$

where n=(1, N), inclusive; $\theta_n$ is the angle of magnet $M_n$, and $\theta_1$ is the angle of the first magnet $M_1$.

For example, when the first magnet $M_1$ has an angle $\theta_1$ of 0 degrees, a second magnet $M_2$ of the N magnets that is immediately adjacent to the first magnet $M_1$ has an angle of $$(2-1) * \frac{360}{N}$$

degrees, and a third magnet $M_3$ of the N magnet that is immediately adjacent to the second magnet $M_2$ has an angle of $$(3-1) * \left(\frac{360}{N}\right)$$

degrees. For a 12-magnet rotation circle, the degrees for magnets are arranged at 0, 30, 60, 90, 120, 150, 180, 210, 240, 270, 300, and 330 degrees.

The number Q of iron cores in each iron core set is different from the number N of the magnets in a magnet group. The number Q of iron cores in each iron core set may be more than or less than the number N of the magnets in a magnet group. In some implementations, the iron core sets each includes a same number of iron cores as other iron core sets. FIGS. 80-99 illustrate an example implementation where a generator includes 12 groups of magnets, each group including 12 magnets arranged helically along an axis, and 12 sets of iron cores each including 11 iron cores. As described herein, the Q iron cores of an iron core set are arranged in a same plane that is substantially orthogonal to the axis.

The Q iron core in iron core set are arranged with angles determined based on the following equation:

$$\mu_q = \mu_1 + \left[(q-1) * \frac{360}{Q}\right], \tag{5}$$

where q=(1, Q), inclusive; $\mu_0$ is the angle of an nth iron core, and $\mu_1$ is the angle of the first iron core.

Figure 83:
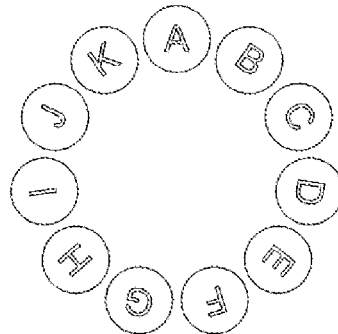
FIG. 83 shows in a front view a set of 12 iron cores.

With reference also to FIG. 83, for the example 11 iron cores in an iron core set, e.g., that each interacts with a magnet in a rotation circle of the magnet, the first iron core A has an angle of $\theta_1$, e.g., 0 degrees, a second iron core B of the Q iron cores that is immediately adjacent to the first iron core A has an angle of $$(2-1)*\frac{360}{Q}$$

degrees, and a third iron core C of the N iron core that is immediately adjacent to the second iron core B has an angle of $$(3-1)*\left(\frac{360}{Q}\right)$$

degrees. Therefore, the degrees for 11 iron cores A, B, C, D, E, F, G, H, I, J, K are 0, 32.7273, 65.4546, 98.1819, 130.9092, 163.6365, 196.3638, 229.0911, 261.8184, 294.5457, and 327.2730 degrees.

Figure 84:
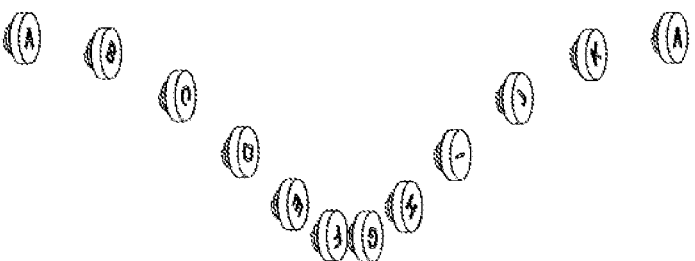
FIGS. 84-85 show in various views respective iron cores of 12 iron core sets adjacent to and interacting with the 12 magnets of a magnet group helically arranged along an axis.
Figure 85:
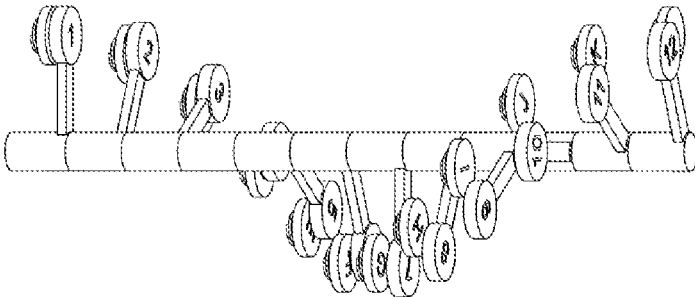
Figure 86:
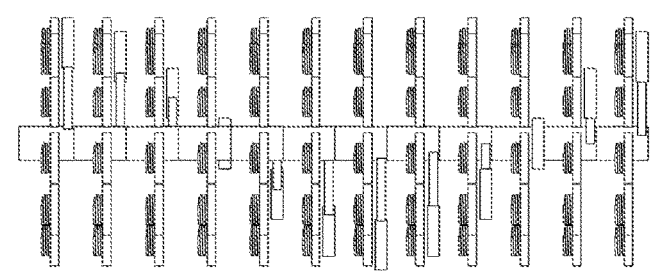
FIG. 86 is the side view of 12 iron core sets relative to 12 magnets of a magnet group helically arranged along an axis.

FIGS. 84-86 show relative positions between magnets of a magnet group and respective iron cores in the iron core sets that adjacent to the magnets, respectively, in an example moment of rotation of the axis, e.g., a balancing point.

FIGS. 87-98 show, in front views, relative positions of magnets of the magnet group with respect to the respective iron cores at the example moment of rotation of the axis as shown in FIGS. 84-86

Specifically, at the example moment of rotation, the magnet M1 has 0 degrees and is fully aligned with and iron core A of the first iron core set, which is arranged with 0 degrees. The magnet 2 and iron core B has 2.7273 degrees difference and the following differences between magnets and iron cores are incrementally adding 2.7273 for each additional magnets and iron cores. In other words, the angles difference for 12 magnets with respect to the respective 12 iron cores (note that magnet 12 is positioned with respect to iron core A of the 12$^{th}$ iron core set) are 0, 2.7273, 5.4546, 8.1819, 10.9092, 13.6365, 16.3638, 19.0911, 21.8184, 24.5457, 27.2730, and 30.0003 degrees for the twelfth magnet. On the other hand, the first difference 2.7273 is one of the balanced points when turning the axis clockwise or counterclockwise.

Figure 87:
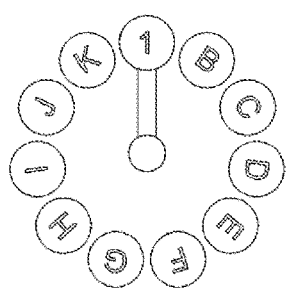

FIG. 87 shows magnet 1 of the first magnet group and the corresponding first iron core set. The first iron core set includes 11 iron cores formed in a circle, which are illustratively referenced with letters A through K sequentially. FIG. 87 shows, as an illustrative example, magnet 1 is at 0 degrees. Magnet 1 is fully aligned with and in front of iron core A (or "letter A iron core") in the first iron core set. The zero-degrees center attractions for magnet 1 and the letter A iron core are balanced.

Figure 88:
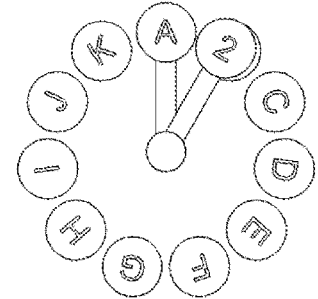

FIG. 88 shows magnet 2 of the first magnet group. The center of magnet 2 is 30 degrees. Magnet 2 is mainly in front of iron core B, the center of which is 32.7273 degrees in the respective second iron core set. The difference or misalignment between the magnet 2 and the respective iron core B of the second iron core set is 2.7273 degrees clockwise.

Figure 89:
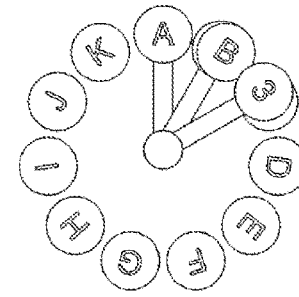

FIG. 89 shows magnet 3 of the first magnet group. The center of magnet 3 is 60 degrees. Magnet 3 is mainly in front of iron core C of the respective third iron core set. The center of iron core C is 65.4546 degrees in the third iron core set. The difference or misalignment between the magnet 3 and the respective iron core C of the third iron core set is 5.4546 degrees clockwise.

Figure 90:
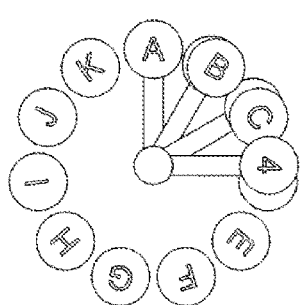

FIG. 90 shows magnet 4 of the first magnet group. The center of magnet 4 is 90 degrees. Magnet 4 is mainly in front of iron core D of the respective fourth iron core set. The center of iron core D is 98.1819 degrees in the fourth iron core set. The difference or misalignment between the magnet 4 and the respective iron core D of the fourth iron core set is 8.1819 degrees clockwise.

Figure 91:
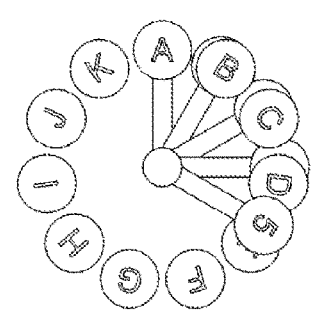

FIG. 91 shows magnet 5 of the first magnet group. The center of magnet 5 is 120 degrees. Magnet 5 is mainly in front of iron core E of the respective fifth iron set. The center of iron core E is 130.9092 degrees in the fifth iron core set. The difference or misalignment between the magnet 5 and the respective iron core E of the fifth iron core set is 10.9092 degrees clockwise.

Figure 92:
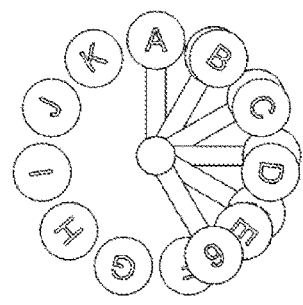

FIG. 92 shows magnet 6 of the first magnet group. The center of magnet 6 is 150 degrees. Magnet 6 is mainly in front of iron core F of the respective sixth iron core set. The center of iron core F is 163.6365 degrees in the sixth iron core set. The difference or misalignment between the magnet 6 and the respective iron core F of the sixth iron core set is 13.6365 degrees clockwise.

Figure 93:
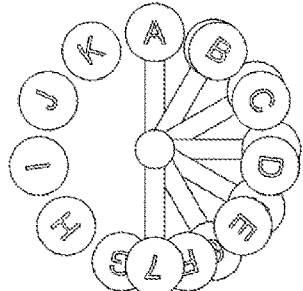

FIG. 93 shows magnet 7 of the first magnet group. The center of magnet 7 is 180 degrees. Magnet 7 is in between iron core F and G in the respective seventh iron core set. The center of iron core F is 163.6365 degrees in the seventh iron core set while the center of iron G is 196.3638 degrees. The difference or misalignment between magnet 7 and respective iron core F is 16.3635 degrees counterclockwise while the difference or misalignment between magnet 7 and the respective iron core G is 16.3638 degrees clockwise.

Figure 94:
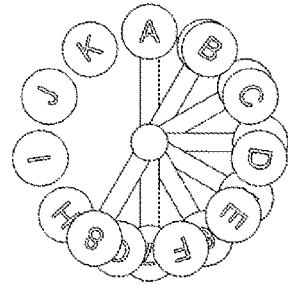

FIG. 94 shows magnet 8 of the first magnet group. The center of magnet 8 is 210 degrees. Magnet 8 is mainly in front of iron core G in the respective eighth iron core set. The center of iron core G is 196.3638 degrees in the eighth iron core set. The difference or misalignment between the magnet 8 and the respective iron core G of the eighth iron core set is 13.6362 degrees counterclockwise.

Figure 95:
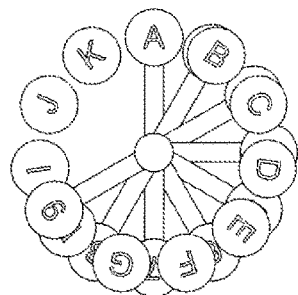

FIG. 95 shows magnet 9 of the first magnet group. The center of magnet 9 is 240 degrees. Magnet 9 is mainly in front of iron core H of the respective nineth iron core set. The center of iron core H is 229.0911 degrees in the nineth iron core set. The difference or misalignment between the magnet 9 and the respective iron core H of the nineth iron core set is 10.9089 degrees counterclockwise.

FIG. 96 shows magnet 10 of the first magnet group. The center of magnet 10 is 270 degrees. Magnet 10 is mainly in front of iron core I of the respective tenth iron core set. The center of iron core I is 261.8184 degrees in the tenth iron core set. The difference or misalignment between the magnet 10 and the respective iron core I of the tenth iron core set is 8.1816 degrees counterclockwise.

FIG. 97 shows magnet 11 of the first magnet group. The center of magnet 11 is 300 degrees. Magnet 11 is mainly in front of iron core J of the respective eleventh iron core set. The center of iron core J is 294.5457 degrees in the eleventh iron core set. The difference or misalignment between the magnet 11 and the respective iron core J of the eleventh iron core set is 5.4543 degrees counterclockwise.

FIG. 98 shows magnet 12 of the first magnet group. The center of magnet 12 is 330 degrees. Magnet 12 is mainly in front of iron core K of the respective twelfth iron core set. The center of iron core K is 327.2730 degrees in the twelfth iron core set. The difference or misalignment between the magnet 12 and the respective iron core K of the twelfth iron core set is 2.7270 degrees counterclockwise.

Attraction for the magnet 1 is balanced with 0 misalignment degrees with respect to iron core A.

Attractions between magnet 2 and magnet 12 are balanced because their misalignment degrees clockwise or counterclockwise only have a 0.0003-degrees difference which is too small to affect their attractions.

Attractions between magnet 3 and magnet 11 are balanced because their misalignment degrees clockwise or counter-clockwise only have a 0.0003-degrees difference which is too small to affect their attractions.

Attractions between magnet 4 and magnet 10 are balanced because their misalignment degrees clockwise or counter-clockwise only have a 0.0003-degrees difference which is too small to affect their attractions.

Attractions between magnet 5 and magnet 9 are balanced because their misalignment degrees clockwise or counter-clockwise only have a 0.0003-degrees difference which is too small to affect their attractions.

Attractions between magnet 6 and magnet 8 are balanced because their misalignment degrees clockwise or counter-clockwise only have a 0.0003-degrees difference which is too small to affect their attraction.

Attraction for the magnet 7 is balanced between iron cores F and G. The misalignment degrees clockwise or counter-clockwise with respect to iron cores F and G only have a 0.0003-degrees difference which is too small to affect their attraction.

In this setting, 2.7273 degrees, i.e., the difference between $$\frac{360}{Q} \text{ and } \frac{360}{N},$$

is one of the balance points for the magnet groups to turn. When the axis rotates, the magnets will reach one of the balanced points with the iron cores. Note that in some implementations, each iron core set are identical and parallel.

For example, as shown in FIG. 99, when the magnet 1 of the first magnet group is at the zero degrees, i.e., the same as the iron core A of the first iron core set. The balance is reached as described hereinabove. Chart 2 (FIG. 116) also shows the details of the angles of the magnets with respect to the respective iron core sets.

As shown in FIG. 100, when the first magnet group rotates the first 2.7273 degrees clockwise, the magnet 2 of the magnet group 1 reaches at 30+2.7273 degrees, which is the same as the iron core B at the 32.7273 degrees, i.e., the magnet 2 is fully aligned with iron core B of the second iron core set. The attraction of magnet 2 is balanced with 0 misalignment degrees with respect to iron core B of the second iron core set. The attractions of other magnets 1 and 3-12 are also balanced similarly as described herein with respect to the scenario that magnet 1 is fully aligned with iron core A of the first iron core set.

As shown in FIG. 101, when the first magnet group rotates the second additional 2.7273 degrees, the magnet 3 of the magnet group reaches at 60+5.4546 degrees, which is the same as the iron core C at the 65.4546 degrees, i.e., the magnet 3 is fully aligned with iron core C of the third iron core set.

As shown in FIG. 102, when the first magnet group rotates the third additional 2.7273 degrees, the magnet 4 of the magnet group reached at 90+8.1819 degrees, which is the same as the iron core D at the 98.1819 degrees, i.e., the magnet 4 is fully aligned with iron core D of the fourth iron core set.

As show in FIG. 103, when the first magnet group rotates the fourth additional 2.7273 degrees, the magnet 5 of the magnet group reached at 120+10.9092 degrees, which is the same as the iron core E at the 130.9092 degrees i.e., the magnet 5 is fully aligned with iron core E of the fifth iron core set.

As show in FIG. 104, when the first magnet group rotates the fifth additional 2.7273 degrees, The magnet 6 of the magnet group reaches at 150+13.6365 degrees, which is the same as the iron core F at the 163.6365 degrees, i.e., the magnet 6 is fully aligned with iron core F of the sixth iron core set.

As show in FIG. 105, when the first magnet group rotates the sixth additional 2.7273 degrees, The magnet 7 of the magnet group reaches at 180+16.3638 degrees, which is the same as the iron core G at the 196.3638 degrees, i.e., the magnet 7 is fully aligned with iron core G of the seventh iron core set.

As show in FIG. 106, when the first magnet group rotates the seventh additional 2.7273 degrees, the magnet 8 of the magnet group reached at 210+19.0911 degrees, which is the same as the iron core H at the 229.0911 degrees, i.e., the magnet 8 is fully aligned with iron core H of the eighth iron core set.

As show in FIG. 107, when the first magnet group rotates the eighth additional 2.7273 degrees, the magnet 9 of the magnet group reached at 240+21.8184 degrees, which is the same as the iron core I at the 261.8184 degrees, i.e., the magnet 9 is fully aligned with iron core I of the nineth iron core set.

As show in FIG. 108, when the first magnet group rotates the nineth additional 2.7273 degrees, the magnet 10 of the magnet group reaches at 270+24.5457 degrees, which is the same as the iron core J at the 294.5457 degrees, i.e., the magnet 10 is fully aligned with iron core J of the tenth iron core set.

As show in FIG. 109, when the first magnet group rotates the tenth additional 2.7273 degrees, the magnet 11 of the magnet group reached at 300+27.2730 degrees, which is the same as the iron core K at the 327.2730 degrees, i.e., the magnet 11 is fully aligned with iron core K of the eleventh iron core set.

As show in FIG. 110, when the first magnet group rotates the eleventh additional 2.7273 degrees, the magnet 12 of the magnet group reached at 330+30.0003 degrees, which is the substantially same as the iron core A at the 0 degrees, i.e., the magnet 12 is fully aligned with iron core A of the twelfth iron core set.

In sum, the first magnet group can always keep the balanced points during the rotation. The other second to twelfth magnet groups similarly can keep the balanced points during the rotation.

In some implementations, the iron core sets each include Q number of iron cores that are greater than the N number of magnets in a magnet group. For example, in a case that each magnet group includes 12 magnets, N=12, each iron core set may include 13 or 14 iron cores, Q=13 or 14.

FIGS. 111 and 112 show an example implementation that a magnet group includes 12 magnets 1-12 and an iron core set includes 13 iron cores from A-M.

Equations (4) and (5) also apply here. Each magnet is 360/12=30 degrees in difference from an adjacent magnet in the magnet group, and the magnets are arranged with angles 0, 30, 60, 90, 120, 150, 180, 210, 240, 270, 300, 330, in a circle.

Each iron core is 360/13=27.6923 degrees in difference from an adjacent iron core in the iron core set, and the iron cores are arranged with angles 0, 27.6923, 55.3846, 83.0769, 110.7692, 138.4615, 166.1538, 193.8461, 221.5384, 249.2307, 276.9230, 304.6153, 332.3076, in a circle.

Referring to FIGS. 111 and 112 together, in a balanced point, Magnet 1 and iron core A are both at 0 degree and they are balanced.

Magnet 2 is 2.3077 degrees counterclockwise to iron core B, while magnet 12 is 2.3076 degrees clockwise to iron core M. Magnet 2 and magnet 12 are balanced.

Magnet 3 is 4.6154 degrees counterclockwise to iron core C, while magnet 11 is 4.6153 degrees clockwise to iron core L. Magnet 3 and magnet 11 are balanced.

Magnet 4 is 6.9231 degrees counterclockwise to iron core D, while magnet 10 is 6.9230 degrees clockwise to iron core K. Magnet 4 and magnet 10 are balanced.

Magnet 5 is 9.2308 degrees counterclockwise to iron core E, while magnet 9 is 9.2307 degrees clockwise to iron core J. Magnet 5 and magnet 9 are balanced.

Magnet 6 is 11.5385 degrees counterclockwise to iron core F, while magnet 8 is 11.5384 degrees clockwise to iron core I. Magnet 6 and magnet 8 are balanced.

Magnet 7 is 13.8462 counterclockwise to iron core G and 13.8641 degrees clockwise to iron core H. Magnet 7 is balanced in between iron core G and H.

As mentioned, magnet 8 is balanced with magnet 6, magnet 9 is balanced with magnet 5, magnet 10 is balanced with magnet 4, magnet 11 is balance with magnet 3, and magnet 12 is balanced with magnet 2. All magnets are balanced with the setting.

Figure 113:
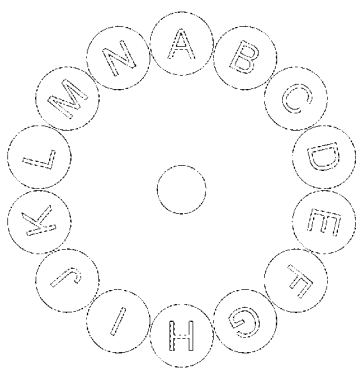
FIGS. 113 and 114 show an example configuration in which a magnet group includes 12 magnets and an iron core set includes 14 iron cores.
Figure 114:
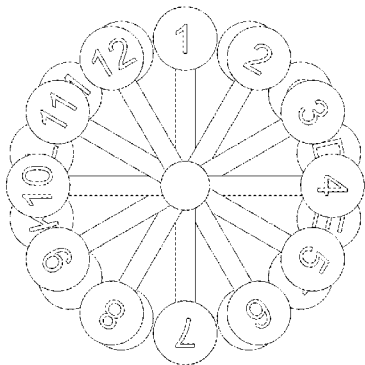

FIGS. 113 and 114 show an example implementation that a magnet group includes 12 magnets 1-12 and an iron core set includes 14 iron cores from A-N.

Equations (4) and (5) also apply here. Each magnet is 30 degrees in difference from an adjacent magnet in the magnet group, and the magnets are arranged with angles 0, 30, 60, 90, 120, 150, 180, 210, 240, 270, 300, 330, in a circle.

Each iron core is 25.7143 degrees in difference from an adjacent iron core in the iron core set, and the iron cores are arranged with angles 0, 25.7143, 51.4286, 77.1429, 102.8572, 128.5715, 154.2858, 180.0001, 205.7144, 231.4287, 257.1430, 282.8573, 308.5716, 334.2859, in a circle.

Magnet 1 and iron core A are both at 0 degree and magnet 1 is balanced by iron core A.

Magnet 2 is 4.2857 degrees counterclockwise to iron core B, while magnet 12 is 4.2859 degrees clockwise to iron core N. Magnet 2 and magnet 12 are balanced.

Magnet 3 is 8.5714 degrees counterclockwise to iron core C, while magnet 11 is 8.5716 degrees clockwise to iron core M. Magnet 3 and magnet 11 are balanced.

Magnet 4 is 12.8571 degrees counterclockwise to iron core D, at the mean time it is 12.8572 degrees clockwise to iron core E. Magnet 4 is balanced by Iron core D and E.

Magnet 5 is 8.5715 degrees clockwise to iron core F, while magnet 9 is 8.5713 degrees counterclockwise to iron core J. Magnet 5 and magnet 9 are balanced.

Magnet 6 is 4.2858 degrees clockwise to iron core G, while magnet 8 is 4.2856 degrees counterclockwise to iron core I. Magnet 6 and magnet 8 are balanced.

Magnet 7 and iron core H are both at 180 degrees and magnet 7 is balanced by iron core H.

Magnet 10 is 12.8573 degrees clockwise to iron core L, and at the same time it is 12.8570 degrees counterclockwise to iron core K. Magnet 10 is balanced by iron core K and L.

As mentioned, magnet 8 is balanced with magnet 6, magnet 9 is balanced with magnet 5, magnet 11 is balance with magnet 3, and magnet 12 is balanced with magnet 2. All magnets are balanced with the setting.

Every 30 degrees turning the rotation will start the same process again. Therefore, each of the 12 magnet groups perform the same situation at the same time and the balance points keep reaching when rotation.

Based on the same reason, one of the turning degrees will be 2.3077 degrees if the iron core numbers are 13 with 12 magnets rotation circle, and one of the turning degrees will be 4.286 degrees if the iron core numbers are 14 with 12 magnets rotation circle.

The same result, one of the turning degrees will be 1.7143 degrees if the iron core numbers are 15 with 14 magnet rotation circle, or one of the turning degrees will be 1.5 degrees if the iron core numbers are 15 with 16 magnet rotation circle.

As shown in the example embodiments, in the operation of the generators of the specification, no matter whether a magnet group includes an odd number of magnets or an even number of magnets, in a time point during the rotation of the axis, a magnet will be in one of the following three states: a first state that a first attraction between the magnet and a first iron core of the first group of iron cores is balanced by a second attraction between another magnet of the first group of magnets and a second iron core of the first group of iron cores; a second state that the magnet is fully aligned with an iron core of the first group of iron cores; and a third state that a third attraction between the magnet and a third iron core of the first group of iron cores is balanced by a fourth attraction between the magnet and a fourth iron core of the first group of iron.

In the current specification, an angle of a magnet or an iron core is described as an angle of a center line of the magnet or iron core, which does not limit the scope of the disclosure. It should be appreciated that an angle of a magnet or an iron core can be referred to in other manners, which does not deviate from the disclosure.

In the current specification, an odd number of 13 magnets in a magnet group or an even number of 12 magnets in a magnet group are used as illustrative examples for descriptive purposes only. Such specific examples do not limit the scope of the disclosure. A magnet group may include any odd number of magnets or any even number of magnets in the various implementations.

Described embodiments of the subject matter can include one or more features, alone or in combination. For example, in a first embodiment, a generator comprises: a frame; an axis coupled to the frame; 13 segments of magnets arranged along the axis, each of the 13 segments of magnets including 12 magnets arranged in a first plane orthogonal to the axis; and 13 sets of iron cores arranged along the axis, each of the 13 sets of iron cores including 12 iron cores arranged in a second plane orthogonal to the axis, the 13 sets of iron cores each adjacent to a corresponding segment of the 13 segments of magnets from a first side of the corresponding segment, and the second plane substantially parallel to the first plane. When 12 magnets of a first segment of the 13 segments of magnets fully align with 12 iron cores of a corresponding first set of the 13 sets of iron cores, magnets of other segments of the 13 segments of magnets each misalign with iron cores of the corresponding sets of iron cores by a misalignment angle of at least about 2.3077 degrees.

A first feature, combinable with any of the following features, specifies that the misalignment angle of a magnet of a segment of magnets is about n*2.3077 degrees, n varying with a distance of the segment of magnets from the first segment of magnets.

A second feature, combinable with any of the previous or following features, specifies that when the 12 magnets of the first segment fully align with the 12 iron cores of the corresponding first set of iron cores, in a second segment of magnets that is immediately adjacent to the first segment of magnets, each of 12 magnets misaligns with a corresponding iron core in a corresponding second set of iron cores by a misalignment angle of about 2.3077 degrees.

A third feature, combinable with any of the previous or following features, specifies that when the 12 magnets of the first segment fully align with the 12 iron cores of the corresponding first set of iron cores, in a third segment of magnets that is immediately adjacent to the second segment of magnets, each of 12 magnets misaligns with a corresponding iron core in a corresponding third set of iron cores by a misalignment angle of about 4.6154 degrees.

A fourth feature, combinable with any of the previous or following features, specifies that The generator further includes another 13 sets of iron cores arranged along the axis, each of the another 13 sets of iron cores including 12 iron cores arranged in a third plane orthogonal to the axis, the another 13 sets of iron cores each adjacent to a corresponding segment of the 13 segments of magnets from a second side of the corresponding segment, and the third plane substantially parallel to the first plane.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A generator, comprising:
a frame;
an axis coupled to the frame;
a first group of magnets arranged helically along the axis, the first group of magnets each being discrete and separated from one another; and
a first group of iron cores arranged helically along the axis, the first group of iron cores each being discrete and separated from one another, wherein when a first magnet of the first group of magnets is aligned with a first iron core of the first group of iron cores, other magnets of the first group of magnets each misalign with corresponding ones of the first group of iron cores with different misalignment angles.

2. The generator of claim 1, wherein the first group of magnets include N magnets, and the first group of iron cores include N iron cores, and
wherein each of the other magnets misaligns with the corresponding one of the first group of iron cores with a misalignment angle of

24

$$n * \left( \frac{360}{(N-1)*N} \right)$$

degrees, where n is an integer in a range from 1 to (N−1), inclusive.

3. The generator of claim 2, wherein when the first magnet of the first group of magnets is aligned with the first iron core of the first group of iron cores, a second magnet that is next to the first magnet in the first group of magnets misaligns with a second iron core that is next to the first iron core in the first group of iron cores by a misalignment angle of $$\frac{360}{(N-1)*N}$$

degrees.

4. The generator of claim 2, further comprising a second group of N magnets arranged helically along the axis and a second group of N iron cores arranged helically along the axis,
wherein each magnet of the second group of magnets is arranged $$\frac{360}{(N-1)}$$

degrees off from a corresponding one of the first group of magnets, and
wherein each iron core of the second group of iron cores is arranged $$\frac{360}{(N-1)}$$

degrees off from a corresponding one of the first group of iron cores.

5. The generator of claim 4, wherein the first group of magnets each includes a first magnetic pole, and the second group of magnets each includes a second magnetic pole opposite to the first magnetic pole.

6. The generator of claim 2, wherein N is an odd integer.

7. The generator of claim 2, wherein N is 13.

8. The generator of claim 2, comprising N−1 groups of N magnets including the first group of magnets, each group of N magnets arranged helically along the axis,
wherein corresponding magnets of adjacent groups of N magnets are arranged $$\frac{360}{(N-1)}$$

degrees off from one another.

9. The generator of claim 2, comprising N−1 groups of N iron cores including the first group of iron cores, each group of N iron cores arranged helically along the axis,
wherein corresponding iron cores of adjacent groups of N iron cores are arranged $$\frac{360}{(N-1)}$$

degrees off from one another.

10. The generator of claim 1, wherein the first group of magnets includes N magnets, and wherein when the first magnet has an angle of 0 degrees, a second magnet of the N magnets that is immediately adjacent to the first magnet has an angle of $$\frac{360}{(N-1)*N}$$

degrees, and a third magnet of the N magnet that is immediately adjacent to the second magnet has an angle of $$2*\frac{360}{(N-1)*N}+\frac{360}{(N-1)}$$

degrees.

11. A generator, comprising:
a frame;
an axis coupled to the frame;
N segments of magnets arranged along the axis, each segment of the N segments of magnets including N−1 magnets arranged in a first plane orthogonal to the axis; and
N sets of iron cores arranged along the axis, each set of the N sets of iron cores including N−1 iron cores arranged in a second plane orthogonal to the axis, each set of the N sets of iron cores adjacent to a corresponding segment of the N segments of magnets, and the second plane substantially parallel to the first plane,
wherein when N−1 magnets of a first segment of magnets fully align with N−1 iron cores of a corresponding first set of iron cores, magnets of other segments of the N segments of magnets each misalign with iron cores of the corresponding sets of iron cores,
wherein the N segments of magnets each includes a different magnet of a first group of magnets arranged helically along the axis, the first group of magnets each being discrete and separated from one another, and
wherein the N sets of iron cores each includes a different iron core of a first group of iron cores arranged helically along the axis, the first group of iron cores each being discrete and separated from one another.

12. The generator of claim 11, wherein when the N−1 magnets of the first segment of magnets fully align with N−1 iron cores of the corresponding first set of iron cores, in a second segment of magnets that is immediately adjacent to the first segment of magnets, each of the N−1 magnets misaligns with a corresponding iron core in a corresponding second set of iron cores by a misalignment angle of about $$\frac{360}{(N-1)*N}$$

degrees.

13. The generator of claim 12, wherein when the N−1 magnets of the first segment fully align with N−1 iron cores of the corresponding first set of iron cores, in a third segment of magnets that is immediately adjacent to the second segment of magnets, each of the N−1 magnets misaligns with a corresponding iron core in a corresponding third set of iron cores by a misalignment angle of about $$2*\frac{360}{(N-1)*N}$$

degrees.

14. The generator of claim 11, wherein the N sets of iron cores are identical to one another and parallel to one another.

15. A generator comprising:
a frame;
an axis coupled to the frame;
N magnet groups each including N magnets arranged helically along the axis, the N magnets being discrete and separated from one another; and
N set of iron cores arranged along the axis, each set of the N sets of iron cores including Q iron cores arranged in a plane substantially orthogonal to the axis, wherein Q is different from N, wherein the N sets of iron cores each includes a different iron core of a first group of iron cores arranged helically along the axis, the first group of iron cores each being discrete and separated from one another.

16. The generator of claim 15, wherein Q=N−1.
17. The generator of claim 15, wherein Q=N+1.
18. The generator of claim 15, wherein Q=N+2.
19. The generator of claim 15, wherein the N magnets of a magnet group of the N magnet groups are arranged to have a substantially same angle difference between every two adjacent magnets of the N magnets.

20. The generator of claim 15, wherein the Q iron core of an iron core set of the N iron core sets are arranged to have a substantially same angle difference between every two adjacent iron cores of the Q iron cores.

21. The generator of claim 15, wherein N is an even integer.

22. A generator, comprising:
a frame;
an axis coupled to the frame;
a first group of magnets arranged helically along the axis, the first group of magnets each being discrete and separated from one another; and
a first group of iron cores arranged helically along the axis, the first group of iron cores each being discrete and separated from one another,
wherein in operation when the first group of magnets rotate with the axis, in a time point, each magnet of the first group of magnets is in one of three states including:
a first state that a first attraction between the magnet and a first iron core of the first group of iron cores is balanced by a second attraction between another magnet of the first group of magnets and a second iron core of the first group of iron cores;
a second state that the magnet is fully aligned with an iron core of the first group of iron cores; and
a third state that a third attraction between the magnet and a third iron core of the first group of iron cores is balanced by a fourth attraction between the magnet and a fourth iron core of the first group of iron.

* * * * *